United States Patent [19]
Frey et al.

[11] Patent Number: 5,410,695
[45] Date of Patent: Apr. 25, 1995

[54] APPARATUS AND METHOD FOR LIST MANAGEMENT IN A COUPLED DATA PROCESSING SYSTEM

[75] Inventors: Jeffrey A. Frey, Fishkill; Audrey A. Helffrich, Poughkeepsie; Jeffrey M. Nick, Fishkill; Michael D. Swanson, Poughkeepsie, all of N.Y.

[73] Assignee: International Business Machines Corporation, Armonk, N.Y.

[21] Appl. No.: 860,633

[22] Filed: Mar. 30, 1992

[51] Int. Cl.$^6$ .................. G06F 9/44; G06F 15/16
[52] U.S. Cl. .................. 395/650; 364/DIG. 1; 364/280; 364/281.3; 364/284; 364/242.94; 364/284.3; 395/700
[58] Field of Search ............... 395/200, 650, 700, 400, 395/425, 375, 800

[56] References Cited
U.S. PATENT DOCUMENTS

| | | | |
|---|---|---|---|
| 4,414,624 | 11/1983 | Summer, Jr. et al. | 364/200 |
| 4,847,754 | 7/1989 | Obermarck et al. | 364/200 |
| 4,912,629 | 3/1990 | Shuler, Jr. | 364/200 |
| 5,008,853 | 4/1991 | Bly et al. | 364/900 |
| 5,175,829 | 12/1992 | Stumpf et al. | 395/375 |
| 5,220,657 | 6/1993 | Bly et al. | 395/425 |
| 5,257,369 | 10/1993 | Skeen et al. | 395/650 |

*Primary Examiner*—Kevin A. Kriess
*Attorney, Agent, or Firm*—William A. Kinnaman, Jr.; Heslin & Rothenberg

[57] ABSTRACT

A Structured External Storage (SES) Facility is coupled to one or more Central Electronic Complex (CEC) Processors, each linked to each other in a System Processing Complex (Sysplex). Applications within a CEC communicate with the SES via messages over a communication means. The SES comprises one or more List Structures, each structure comprising one or more Lists, each List comprising a list control and none or more List Entries. List Entries may be keyed or unkeyed, have a List Entry Identifiers (LEID), created within the SES, and unique within a particular List Structure. List Entries may also have a unique (within a List Structure) Name, created and managed by the application. A plurality of List commands are provided for creating, locating, moving and deleting List Entries—with location reference possible by LEID, Name, Key, Location within List, or a combination of Key and Location within Key. Name and LEID are preserved between moves, while Key may or may not be changed, and will be used to determine relative location.

20 Claims, 17 Drawing Sheets

FIG. 4B

REQUEST OPERANDS                    ╭─402

| LEID-404 | LEK-428  | ETELR-461 | TDIR-478  |
| LEN-405  | ELT-429  | LELX-462  | MELT-479  |
| DIR-406  | LC-433   | SID-465   | DBS-4A3   |
| VN-411   | ALE-434  | SS-466    | RT-4A4    |
| LRT-412  | LET-435  | USC-467   | SDI-4A8   |
| LLB-413  | DLES-436 | LCT-468   | EDI-4A9   |
| LTEN-414 | MDLES-437| LECL-469  | LELCL-4AA |
| CGLM-415 | KRT-439  | ULC-472   | RLT-4AB   |
| LLM-416  | DELT-440 | UAC-475   | RX-4AC    |
| UID-418  | LNT-441  |           | RVN-4AD   |
| WRT-420  | LNEN-442 |           |           |
| CVN-421  | NESC-443 |           |           |
| VRT-422  | SU-444   |           |           |
| LN-423   | LNRT-445 |           |           |
| LTEX-425 | LST-447  |           |           |
| LTEC-427 | TLEK-452 |           |           |
|          | TLN-453  |           |           |

FIG. 4C

RESPONSE OPERANDS  403

| | | |
|---|---|---|
| RC-407 | MLSEC-480 | RVN-4A0 |
| VN-408 | MLSELC-481 | ALE-4A1 |
| LEID-410 | SS-482 | RLEC-4A2 |
| UID-419 | LST-483 | RT-4A5 |
| LN-430 | LTEX-484 | DLEC-4A7 |
| LTEN-431 | LELX-485 | CDI-4B0 |
| LEC-446 | ETELR-486 | LELC-4B2 |
| LEN-448 | LTEC-487 | LSTC-4B1 |
| LEK-449 | LC-488 | MDLES-4B3 |
| DLES-451 | LSELC-490 | LELCL-4B4 |
| LTE-455 | NLTEC-491 | |
| SI-456 | LSEC-492 | |
| LECL-459 | USC-494 | |
| | UIDV-495 | |
| | ULC-497 | |
| | UAC-499 | |

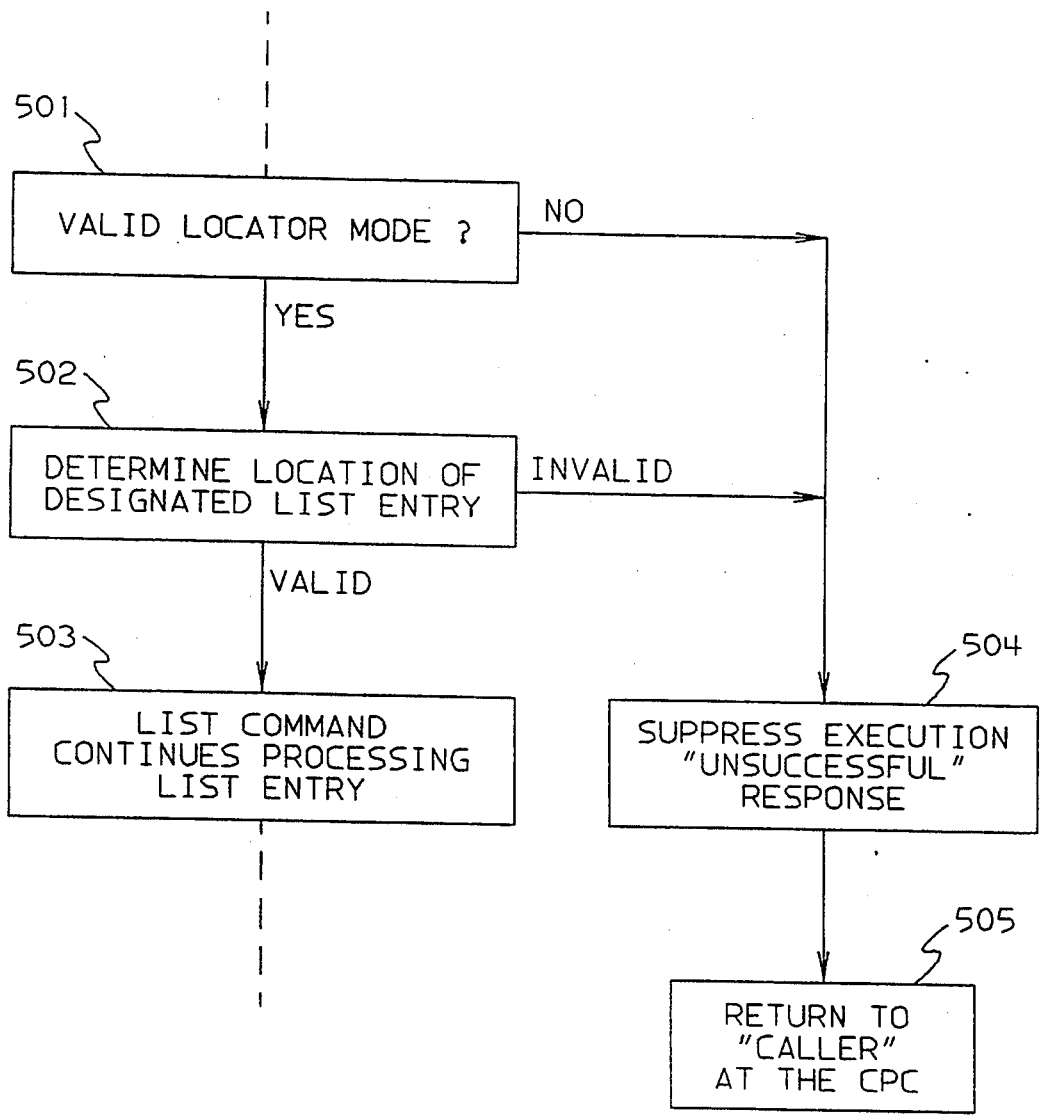

FIG. 6

| ELT SPECIFIES → / LST SPECIFIES ↓ | LOCATE BY UNKEYED POSITION | LOCATE BY KEYED POSITION | LOCATE BY LEID | LOCATE BY LEN |
|---|---|---|---|---|
| KEYED LIST ENTRIES | VALID | VALID | VALID | NOT VALID |
| NAMED LIST ENTRIES | VALID | NOT VALID | VALID | VALID |

FIG. 9

IF PROCESS IS TO REPLACE, MOVE, READ, DELETE AN ENTRY, AND

| IF KRT SPECIFIES (IGNORED IF ELT IGNORED) | IF DIR SPECIFIES LEFT TO RIGHT DIRECTION THEN DESIGNATED LIST ENTRY IS LEFTMOST ENTRY WITH... |
|---|---|
| LEK OBJECT=LEK OPERAND (901) | ...LEK OBJECT=LEK OPERAND (902) |
| LEK OBJECT≤LEK OPERAND (903) | ...LARGEST LEK OBJECT ≤ LEK OPERAND (904) |
| LEK OBJECT≥LEK OPERAND (905) | ...SMALLEST LEK OBJECT ≥ LEK OPERAND (906) |

IF PROCESS IS TO REPLACE, MOVE, READ, DELETE AN ENTRY, AND

| IF KRT SPECIFIES | IF DIR SPECIFIES RIGHT TO LEFT DIRECTION THEN DESIGNATED LIST ENTRY IS RIGHTMOST ENTRY WITH... |
|---|---|
| LEK OBJECT=LEK OPERAND (907) | ...LEK OBJECT=LEK OPERAND (908) |
| LEK OBJECT≤LEK OPERAND (909) | ...LARGEST LEK OBJECT ≤ LEK OPERAND (910) |
| LEK OBJECT≥LEK OPERAND (911) | ...SMALLEST LEK OBJECT ≥ LEK OPERAND (912) |

APPARATUS AND METHOD FOR LIST MANAGEMENT IN A COUPLED DATA PROCESSING SYSTEM

CROSS-REFERENCE TO RELATED APPLICATIONS

This application contains subject matter which is related to the subject matter of the following applications which are assigned to the same assignee as this application. They are hereby incorporated by reference:

"Configurable, Recoverable Parallel Bus" by N. G. Bartow et al, Ser. No. 07/839,657, Filed: Feb. 20, 1992; "High Performance Intersystem Communications For Data Processing Systems" by N. G. Bartow et al, Ser. No. 07/839,652, Filed: Feb. 20, 1992; and "Frame-Group Transmission And Reception For Parallel/Serial Buses", Ser. No. 07/839,986, Filed: Feb. 20, 1992, now U.S. Pat. No. 5,267,240.

The subject matter in the following listed applications is related to and is hereby incorporated by reference in the present application. Each of the following listed applications is owned by the same assignee as the present application, is filed on the same day as the present application, and has the same priority date as the present application. They are:

"Communicating Messages Between Processors And A Coupling Facility" by D. A. Elko et al, Ser. No. 07/860,380; "Sysplex Shared Data Coherency Method and Means" by D. A. Elko et al, Ser. No. 07/860,805; "Method and Apparatus For Distributed Locking of Shared Data, Employing A Central Coupling Facility" by D. A. Elko, et al., Ser. No. 07/860,808; "Command Quiesce Function" by D. A. Elko et al, Ser. No. 07/860,330; "Storage Management For A Shared Electronic Storage Cache" by D. A. Elko et al, Ser. No. 07/860,807; "Management Of Data Movement From A SES Cache To DASD" by D. A. Elko et al, Ser. No. 07/860,806; "Command Retry System" by D. A. Elko et al, Ser. No. 07/860,378; "Integrity Of Data Objects Used To Maintain State Information For Shared Data At A Local Complex" by D. A. Elko et al, Ser. No. 07/860,800; "Management Of Data Objects Used To Maintain State Information For Shared Data At A Local Complex" by J. A. Frey et al, Ser. No. 07/860,797; "Recovery Of Data Objects Used To Maintain State Information For Shared Data At A Local Complex" by J. A. Frey et al, Ser. No. 07/860,647; "Message Path Mechanism For Managing Connections Between Processors And A Coupling Facility" by D. A. Elko et al, Ser. No. 07/860,646; "Method And Apparatus For Notification Of State Transitions For Shared Lists of Data Entries" by J. A. Frey, et al., Ser. No. 07/860,809; "Method And Apparatus For Performing Conditional Operations on Externally Shared Data" by J. A. Frey, et al., Ser. No. 07/860,655; "Interdicting I/O And Messaging Operations In A Multi-System Complex" by D. A. Elko, et al., Ser. No. 07/860,489; and "Method and Apparatus for Coupling Data Processing Systems" by D. A. Elko, et al., Ser. No. 07/860,803 now U.S. Pat. No. 5,317,739.

BACKGROUND OF THE INVENTION

This invention relates generally to the field of data processing systems. More particularly, it deals with the management of lists of data that are shared between processes on one or more systems and the ability of programmed applications to access the shared data by a process that is independent of the physical location of the shared data.

When a list of data items is to be used by a program executing in a data processing (DP) system, many techniques exist to provide the program access to the data—with the technique related to the medium on which the data resides, and the mechanism used to retrieve the data. For example, in virtual addressing systems such as IBM's MVS/ESA there are "common" virtual address ranges where each address space shares a single set of page tables and data is shared by the simple expedient of having it located at a known virtual address within this range, or located by a pointer at a known address. As is known, appropriate locking techniques must be provided so that processes accessing this shared data do not interfere with each other.

When the data to be shared resides on an external storage medium, such as a DASD (Direct Access Storage Device), sharing processes must each have knowledge of a physical location of the data on the DASD, or must access the data through a shared catalog, or a similar device. Again, appropriate locking methods must be used.

In many environments, it is desirable to provide application programs with ways to access data items and, more particularly, lists of data items that are independent of the physical location of the data—for example, by name (e.g., IBM's partitioned data set (PDS) structure provides for a directory associated with the PDS that enables an accessor to reference a member by name), or by key (e.g., IBM's Virtual Storage Access Method (VSAM) provides for access to data records by an associated key), within the data set. A common characteristic of these techniques is that a great deal of responsibility for the management of the data and the physical location of the data on the storage media is placed with the programs sharing the data—for example, an application program executing on a system and creating a PDS member on DASD must communicate the name of that member to other systems in order to make the data in that member effectively shareable by those other systems. Furthermore, known techniques (even those like PDS's that enforce name uniqueness) require inter-process communication to avoid situations where reuse of names (or other identifiers) causes loss of data integrity because an accessor using a previously obtained name subsequently accesses unrelated data associated with the same name.

It is thus an object of the present invention to provide a system structure, list data structures, and list data access functions to provide for efficient sharing of data among two or more applications.

It is a further object of this invention to provide for physical data location independent of access to shared data.

It is a further object of this invention to provide data sharing applications with a means to access data by logical relative position within a data list.

It is a further object of this invention to provide a system for managing named data entries, each data entry name being unique within a list structure.

It is a further object of this invention to provide for the generation and management of non-reusable data entry identifiers by which data entries may be accessed by data sharing applications.

It is a further object of this invention to provide for list-direction-oriented retrieval of data entries by data sharing applications.

It is a further object of this invention to provide for movement of keyed data entries among data lists with or without change to the associated data entry key.

SUMMARY OF THE INVENTION

The present invention provides for efficient data sharing among applications executing on processors having access to a shared data processor (here termed a Structured External Storage facility, or SES) by presenting a system in which individual data entries are placed in "Lists" within a "List Structure" within the SES, and applications sharing access to the data are presented with a variety of techniques for accessing the data that are independent of the physical location of the data within the SES, but rather represent attributes of the data entries. These techniques include:

Access by Name

Wherein the management (assignment, tracking) of the names is left to the applications, but the SES processor insures uniqueness of names within a List Structure by rejecting the creation of a new list entry within a list structure with the name of an already existing entry within that structure.

Access by ID

Wherein the SES processor creates a unique (within a list structure) List Entry Identifier (LEID) at list entry creation, and prevents reuse of a given LEID for the existence of the list structure (including after deletion of the list entry).

Access by Keyed Position

Wherein a Key supplied by the creating application determines position of the list entry within a specified list, and wherein movement of the associated list entry among lists within the list structure is permitted with or without change of key, but with repositioning of the entry by key on the target list. Subsequent location of the entry may be made by identifying the particular list, the key, and directional information.

Access by Unkeyed Position

Wherein list identification and direction information identify a position within the identified list to locate or store the entry in question.

BRIEF DESCRIPTION OF THE DRAWINGS

FIGS. 4A, 4B and 4C are block diagrams illustrating the structure and contents of a message command block and a message response block for a List-Structure command.

FIG. 5 is a flowchart showing the overview of the process for locating list entries by attribute on read, replace, delete, or source or move.

FIG. 6 is a block diagram showing what combinations of the entry-locator type and the list structure type are valid or invalid.

FIG. 9 is a diagram that provides a summary of how the designated list entry on a replace, move, read or delete operation, is determined when a list entry is located by keyed position.

DESCRIPTION OF THE PREFERRED EMBODIMENT

Overview

One or more programmed-applications 105 to 108 on a plurality of processors (central processing complexes, or CPCs 101 to 104) share lists 109 of data entries that exist in a shared electronic storage facility (a SES facility 110) which is shared by the plurality of processors. Lists of data entries are defined to exist in SES facility which is shared among multiple users. Management functions for the lists of data entries are performed in the SES facility and relieve the list user program of the burden of storage management and physical location management for shared data.

The list user applications are provided with a varied set of capabilities and services comprising:

1. A structure of list objects which are managed within and by the SES facility using object based techniques of management.

2. Operations against the list objects in the storage device which support the allocation, creation, replacement, deletion, reading, and movement of list entries.

3. The ability to locate or reference list entries in the list structures by attribute and not be dependent on the physical location of the data.

Figure 1:
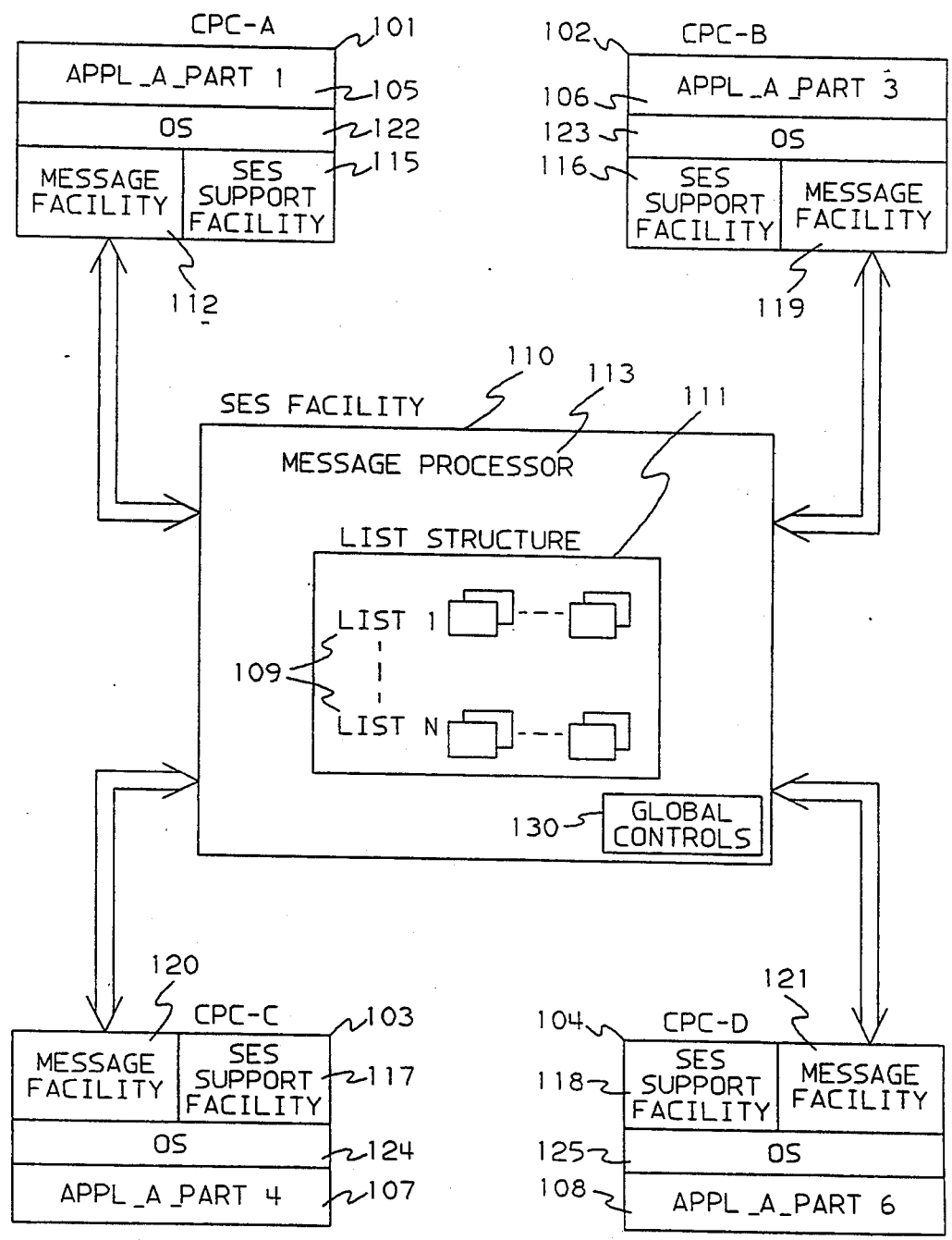
FIG. 1 is a block diagram illustrating the environment in which programmed applications in different CPC's share a list in the SES facility.
Figure 2:
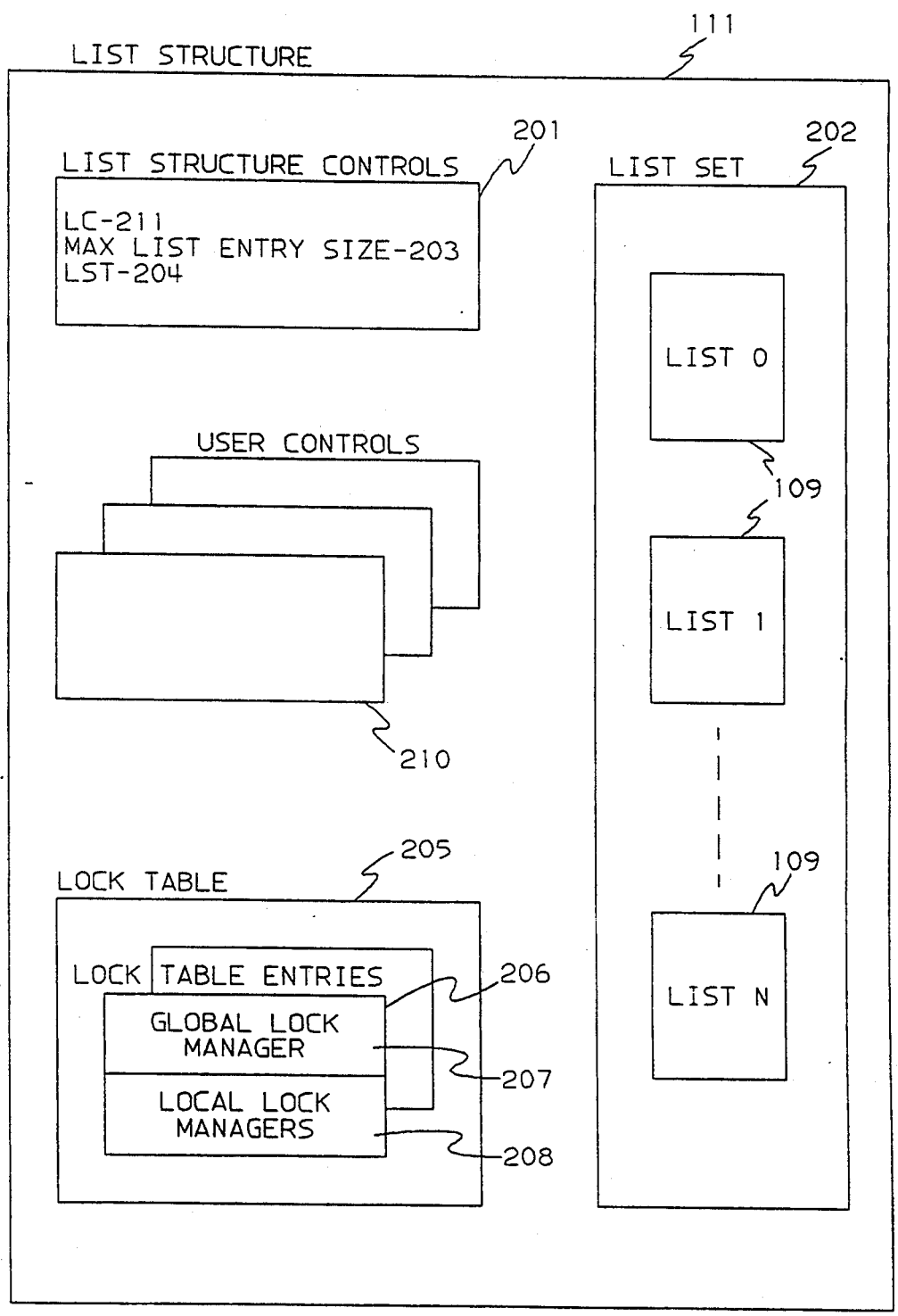
FIG. 2 is a block diagram illustrating the overview structure of a List Structure in the SES facility.
Figure 3:
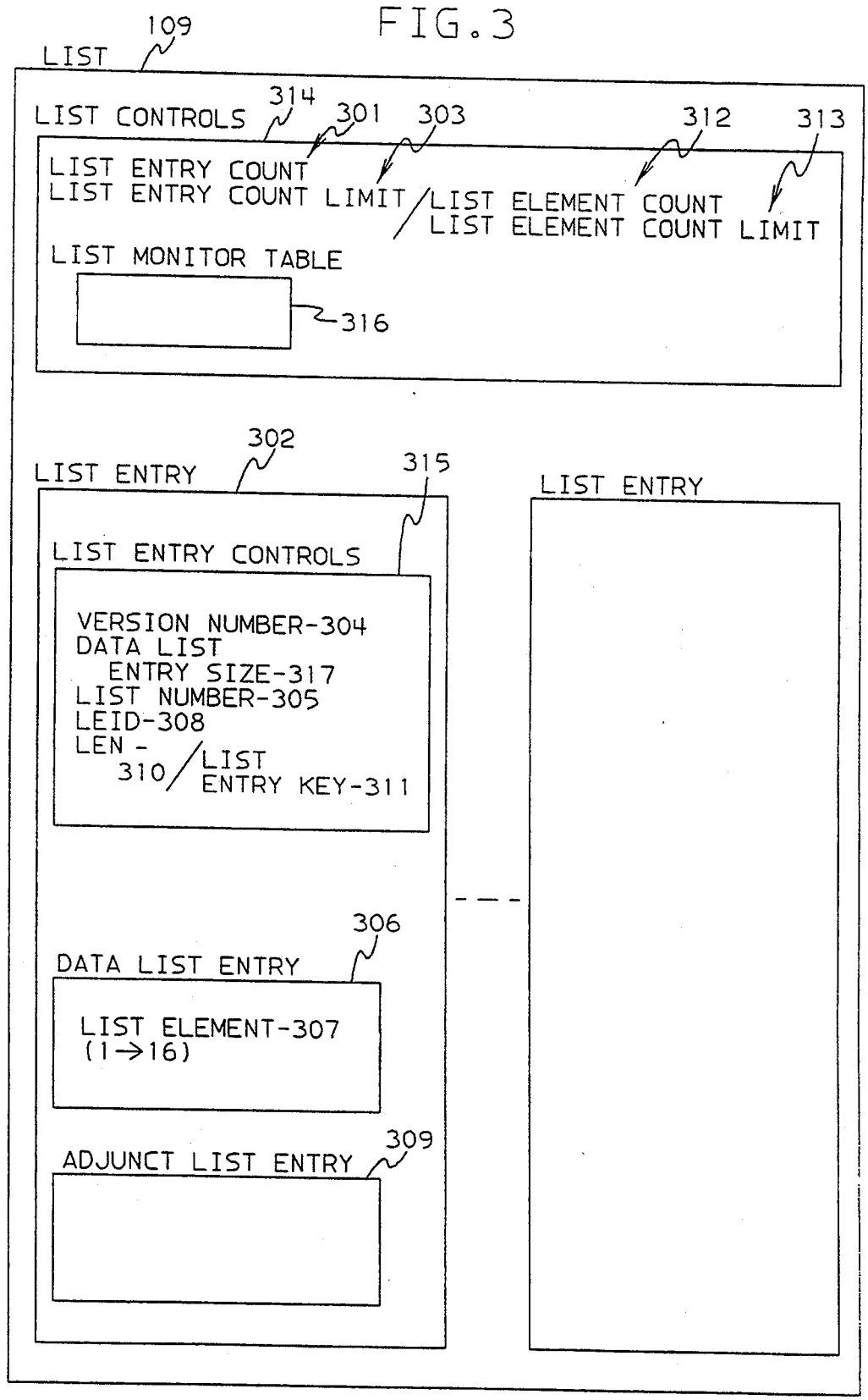
FIG. 3 is a block diagram illustrating the structure of a List object in the SES facility.

FIGS. 2 and 3 show objects in a list structure 111 which are defined and exist in the SES 110. A separate section below defines the contents of the objects and the relationships between the objects which are diagrammed in these two figures.

Operations Against the List Structure

There are many operations (or commands) that are supported. These operations/commands permit program applications executing on the CPU to:;

1. Allocate list structures and objects in the SES;
2. Identify themselves as users of the list structures;
3. Register interest in notification of transitions in the states of particular lists (e.g., empty-non empty);
4. Create/Replace/delete/read/move list entries 302;
5. Deallocate list structures, deregister interest, and remove themselves as list structure users.

The storage objects and processes in SES 110 are accessed using commands issued by the program 105–108. Commands are packaged in a message command block 409, and are communicated from the message facility (112, 119, 120, 121) to the message processor 113 via the Send Message CPU instruction. The message processor returns the summarized results of the operation in the message response block object 417.

Figure 4A:
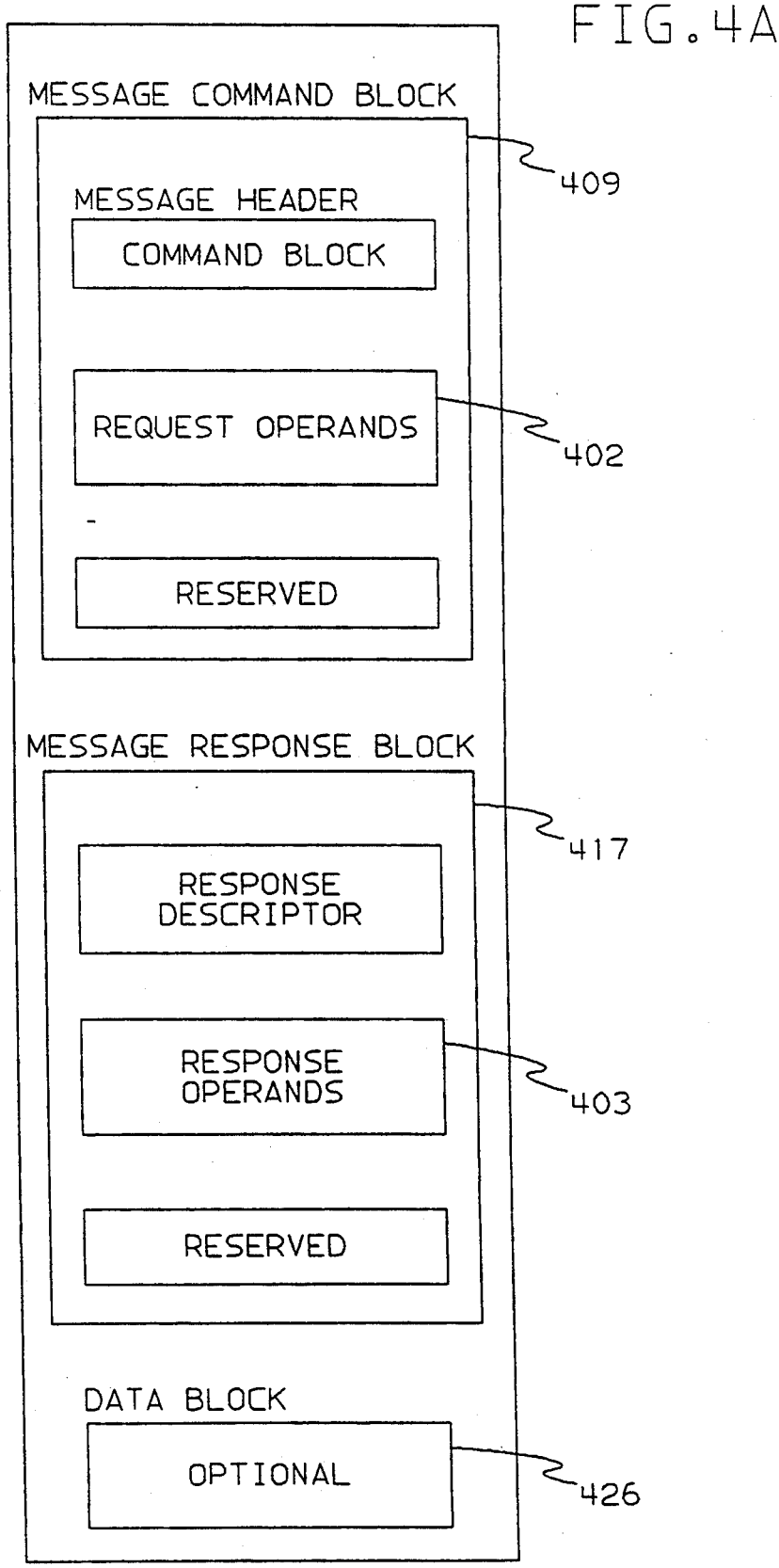

FIG. 4 shows the structure of a message command block 401 and message response block 417 with emphasis on the command operands which are discussed in this invention and can be specified by programming in the request operands object 402, and the structure of the response operands object 403 which is returned to the program 105–108 when list-structure commands complete their processing.

Fundamental to the present invention are the sub-operations of Locating Source Data (e.g, in a READ, REPLACE, MOVE or DELETE operation), and Determining a Target Position for Data (e.g, in a MOVE or CREATE operation). To serve as a basis for the more detailed descriptions of the operations and structures to follow, the following introduction is presented.

Locating Source List Entries

SES facility 110 may contain one or more List Structures 111. Each such list structure contains one or more lists 109, each comprising list entries 302. In locating a particular List entry, four methods of access are described by the present invention (the specific mode is specified by the Entry Location Type (ELT) operand 429 for read, replace, delete or source of a move and implied for a create or a target of a move).

Access by Name:

List entry names (LENs) are created and managed by the program/application accessing the list. Names are unique within a particular list structure 111, and any attempt by an application to create a duplicate name results in an operation failure. The capability of associating a program-specified name with each list entry in each list is an option specified at the initial creation (allocation) of the list structure.

Access by ID:

At the creation of each list entry, a list management function in the Message Processor 113 creates a "List Entry Identifier" (LEID) that is unique within the scope of a particular list structure. The LEID is non-reusable—i.e., the SES does not reassign a LEID even after an associated List Entry has been deleted, so that an application can refer to a list entry within a list structure by LEID without concern that an unintended list entry may be returned (as long as the LEID specified is the one originally assigned). If the entry has been deleted, an indicative response code for "invalid LEID" is returned.

Access by Keyed Position:

As with access by name (LEN), the capability of associating a Key with a List Entry (an LEK) is optional, and is specified when the List Structure is created. In the embodiment described, the use of Key identification is mutually exclusive with Name, though those of ordinary skill in the art will recognize that both could be provided without departing from the framework of the present invention. Though a Key determines position within a particular List, a List Entry may be moved between Lists (within a List Structure) without changing its Key, with the value of the key determining a new position in the new (target) list. It is also possible to move a list entry between lists and explicitly request a change in the key, with the changed value of the key determining a new position in the new (target) list. In locating an entry by keyed position, required parameters are: List number (identifying a particular List within a List Structure); Key; Direction (identifying, within a set of identical key values, whether to select the "leftmost" or "rightmost" List Entry); and when a read, replace, source of move or delete operation is requested, a Key Request Type (a "selection predicate", having values such as =, < =, etc., which identify whether to select only a List Entry with equal key value, with less than or equal key value, etc.).

Access by Unkeyed Position:

A location technique by which the list entry may be selected, within a particular list, by "first" ("leftmost") position, or "last" ("rightmost") position. An identification of a List Entry by this technique is unique within a particular list. Required parameters are List Number (Identifying a list within a List Structure), and Direction (Identifying the first, or last, entry).

Determining a Target Position for a List Entry:

Target positions may be identified by either Keyed or Unkeyed Position, with required parameters (specifying List Number (LN and TLN), Direction (DIR and TDIR), and List Entry Key (LEK and TLEK) as noted above in the descriptions of these location techniques. As is demonstrated more fully below, a List Entry which is moved to a new list will retain its original LEID and List Entry Name, and may even retain its original Key, though the Key may result in a new relative position in the new List.

When a list entry is created as part of a write-and-move list entry command, list entry creation is performed conceptually prior to list entry movement.

Accessing Data by Attribute

By allowing access of the data by attribute, it is possible to minimize communication related to movement of shared data between systems in a SYSPLEX since location by attribute is not affected by (is independent of) the physical relocation within the List structure 111.

FIG. 5 summarizes the common processing, within List command, for locating a list entry. For create and target of a move operation, the list entry position is located by keyed position when the entries are keyed, or by unkeyed position when the entries are not keyed. For the read, replace, delete or source of move operations, the entry-locator type operand (429) is checked 501 for valid consistency with the name indicator and key indicator fields of the list-structure type object 204. (FIG. 6 summarizes the valid and invalid combinations of the entry-locator type (ELT) operand 429 and the list-structure type object 204. When determining a target position, the ELT is ignored.) The determination 502 of the location of List Entry is next performed. The location may be determined by:

1. Unkeyed position,
2. Keyed position,
3. List-entry identifier, or
4. List-entry name.

This processing is described further in FIGS. 7 and 8 and the associated text below.

For the read, replace, delete, or source of move operations, when the designated list entry does not exist, the execution of the list-structure command is suppressed 504 and an indicative (unsuccessful) response code (407) is returned 505 to the caller at the CPC.

For the read, replace, delete, or source of move operations, when the designated list entry exists, the list-structure command continues its processing 503 of the list entry (302).

Locating a List Entry

Figure 7:
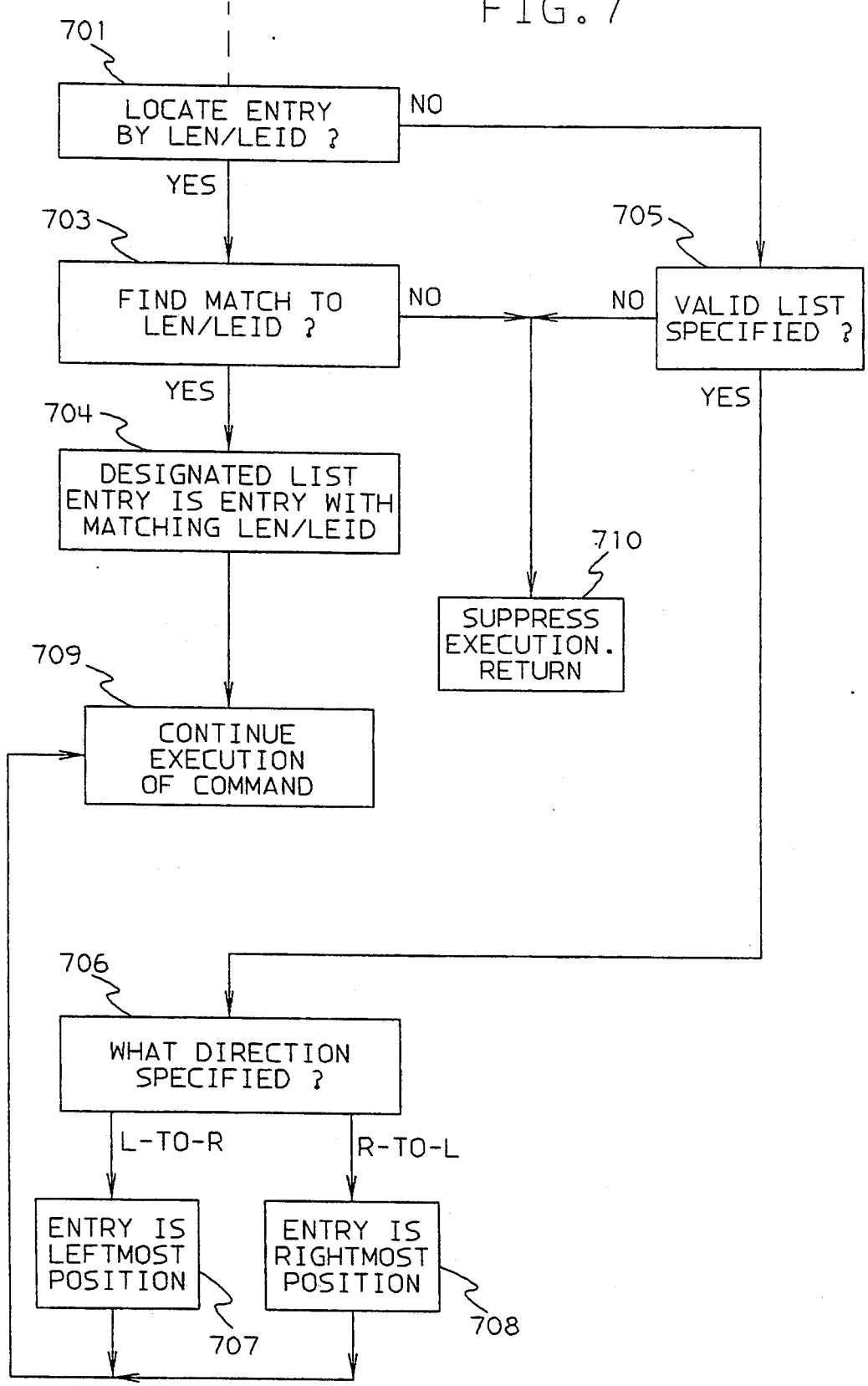
FIG. 7 is a flowchart showing the process for finding the designated list entry when locating a list entry by list entry name, by list entry identifier, and by unkeyed position.

FIG. 7 summarizes the processing involved in locating a list entry—by name, LEID, or unkeyed position.

Locating by List-Entry Name

The list-entry name (LEN) (310) provides a direct method for addressing a list entry 302 and is provided by the program 105. The SES 110 enforces that the name is unique to the list structure 111. It is not changed by movement of a list entry 302 to another list 109. The program may institute a naming convention that guarantees unique names and allows sharing of data in the CPC without having to separately communicate the names among the CPCs.

A list entry (302) is located 701 by list-entry name (405) when the list entries are named 310 and an entry-locator type 429 specifies locate by list entry name 405.

When the designated list entry does not exist, ("N" path from test at 703), an indicative response code (407) is returned 710.

Locating by List-Entry Identifier

The list-entry identifier (LEID 308) provides a direct method for addressing a list entry (302) and is provided by the SES 110 when the entry is created. The list-entry identifier (308) is unique to the list structure.

The list-entry identifier 308 is provided to the program so that: (1) the program is not required to manage the creation of unique names; and (2) the program can be certain it is dealing with a particular list entry instance.

A list entry 302 is located 701 by list-entry identifier 308 when an entry-locator type 429 specifies locate by list entry identifier 404.

When the designated list entry does not exist, an indicative response code (407) is returned 710.

Locating by Position

The position of a list entry (302) in a list (109) is determined when it is created, and may be changed when it is moved or any other entry in the list is created, deleted or moved.

The position of a list entry (302) can either be a keyed position or an unkeyed position. The unkeyed position is specified as a leftmost or rightmost position on a particular list, via the directional operand (DIR 406 and TDIR 478).

When list-entry keys (311) exist, the keyed list entries (302) are ordered by key with the lowest numerical key at the leftmost position. The list-entry key (311) is assigned by the program via the list-entry key operand (428) or the TLEK (452).

Locating by Unkeyed Position

A list entry (302) is located 705 by unkeyed position when an entry-locator type (429) specifies locate by unkeyed position or an unkeyed entry is created or the target of a move. The designated position is specified by means of a list number and a direction. In the case of determining the location for the target of a move, this is specified by TLN (453) and TDIR (478).

A designated position exists when the list (109) specified by LN (423) or TLN (453) exists 705.

For the read, replace, delete or source of a move operation, when locating a designated list entry and the designated list entry does not exist, an indicative response code is returned.

When a list entry 302 is located by unkeyed position and a left-to-right direction is specified (FIG. 7 at 707), the designated list entry is the leftmost entry in the list.

When a list entry 302 is located by unkeyed position and a right-to-left direction is specified (FIG. 7 at 708), the designated list entry is the rightmost entry in the list.

When a designated position is determined and a left-to-right direction (FIG. 8 at 815) is specified, the designated position is the leftmost position in the list.

When a designated position is determined and a right-to-left direction (FIG. 8 at 816) is specified, the designated position is the rightmost position in the list.

Locating by Keyed Position

A list entry (302) is located by keyed position when the list-structure type (204) indicates that the list entries are keyed and an entry-locator type (429) specifies locate by keyed position.

Figure 8A:
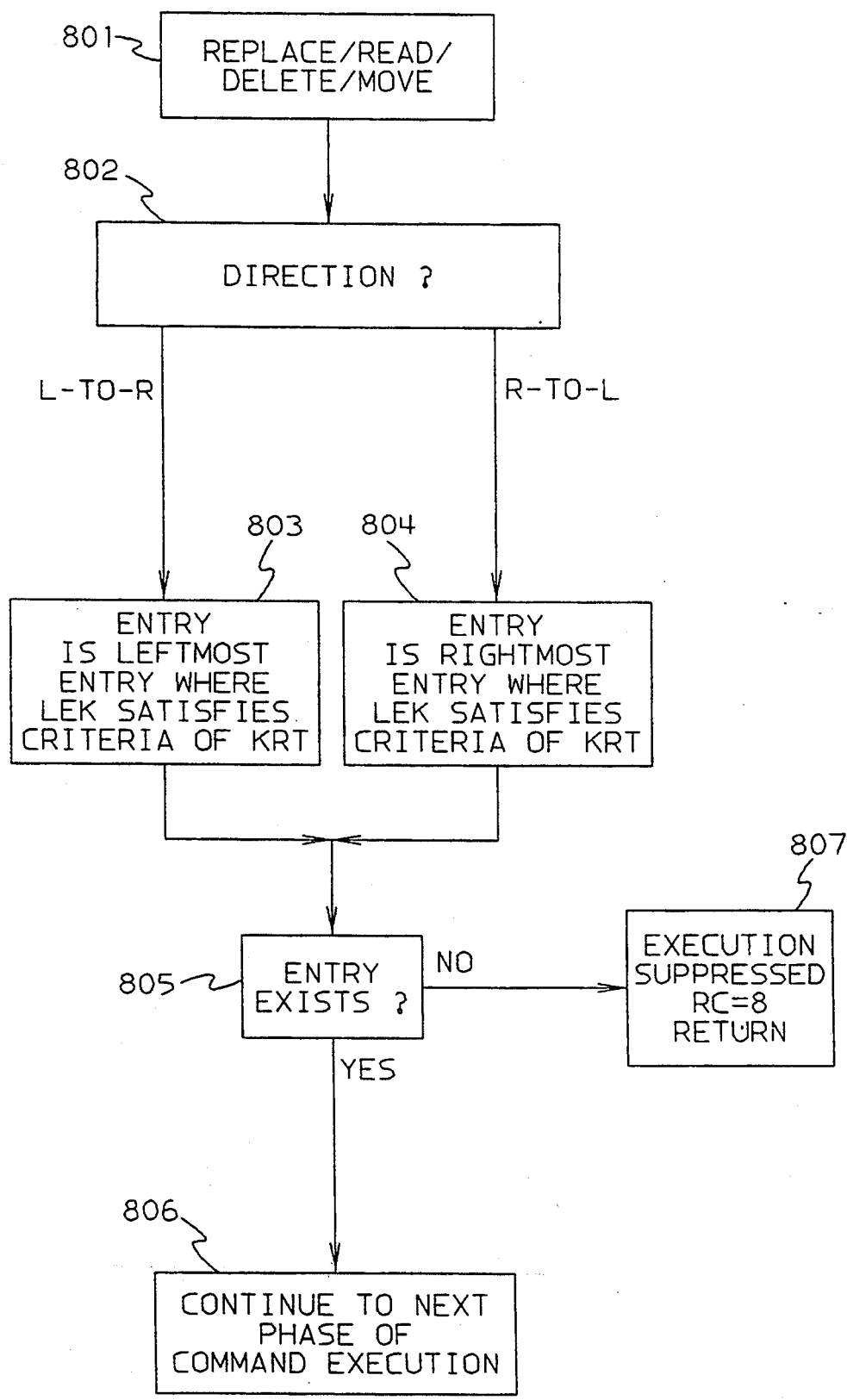
FIGS. 8A and 8B are flowcharts showing the process for determining a designated list position by keyed and unkeyed access.
Figure 8B:
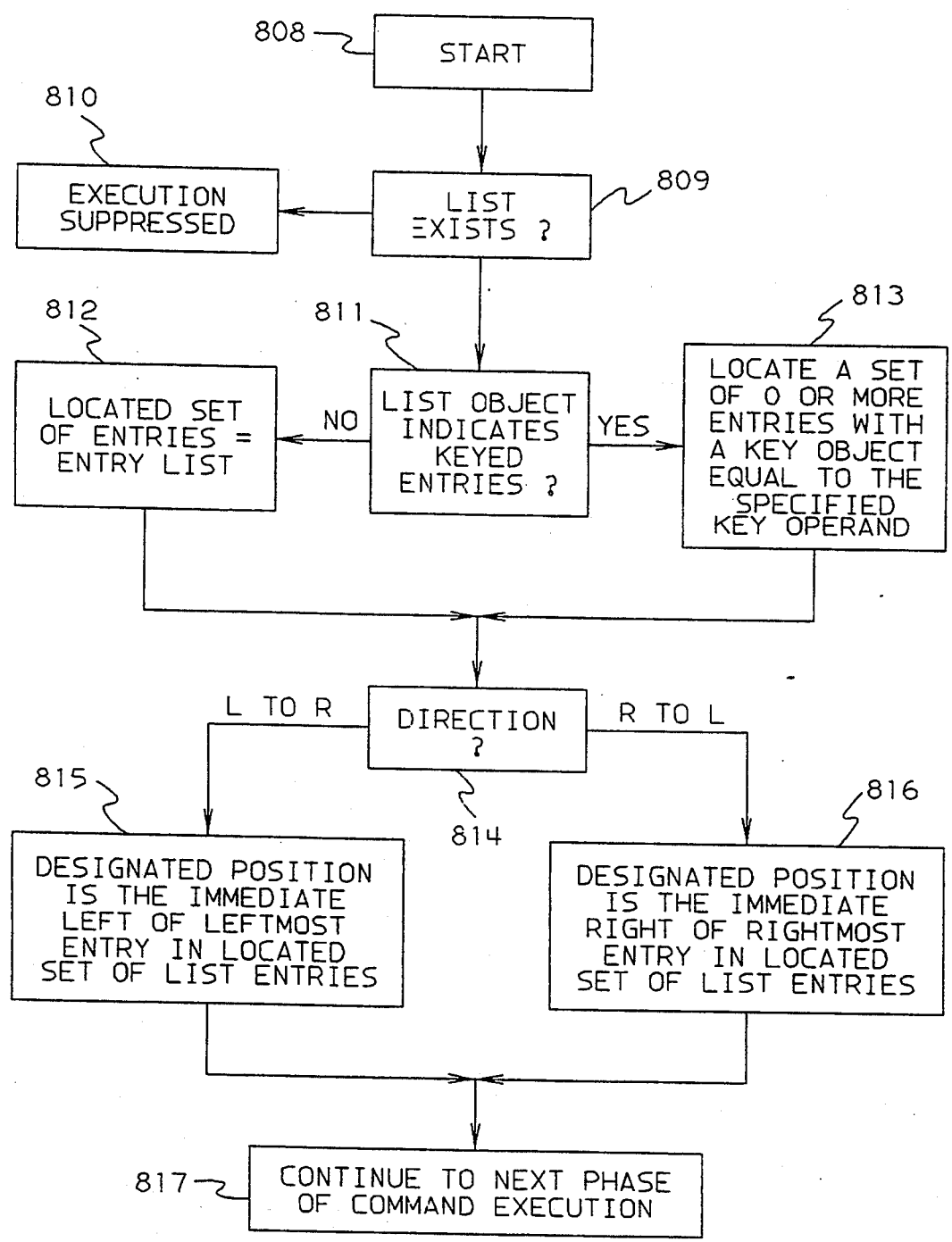

FIGS. 8A and 8B summarize the process of locating a list entry by keyed position. When a list entry (302) is located by keyed position, the designated list entry exists (depending on the KRT (439) specified) when a list entry in the list has a key that is equal, greater than or equal, or less than or equal to the specified list-entry key (428).

FIG. 9 provides a summary of how the designated list entry is located on a replace, move, read or delete operation, when a list entry (302) is located by keyed position. In FIG. 9, the term LEK_OBJECT is a convention for referring to the list-entry-key object (311). In FIG. 9, the term LEK_OPERAND is a convention for referring to the list-entry-key request operand (428).

When a keyed list entry (311) is replaced, read, deleted, or moved (source) 801, the designated list entry is specified on the list-structure command by means of key-request type (439), a list number (423), direction (406), and a list-entry key (428).

If the key-request type (439) specifies a search for a list entry key equal (901), and a left to right direction (406) is specified 802 and 913, then the designated list entry is 803 the leftmost entry 914 with a list entry key object (311) equal 902 to the specified list-entry-key request operand (428).

If the key-request type 439 specifies 903 a search for a less than or equal key, and a left to right direction (406) is specified 802 and 913, then the designated list entry is 803 the leftmost entry 914 with the greatest list entry key object (311) less than or equal 904 to the specified list-entry-key request operand (428).

If the key-request type 429 specifies a search for a greater than or equal key 905, and a left to right direction 406 is specified 802 and 913, then the designated list entry 803 is the leftmost entry 914 with the smallest list entry key object (311) greater than or equal 906 to the specified list-entry-key request operand (428).

If the key-request type (429) specifies a search for a list entry key equal 907, and a right to left direction (406) is specified 802 and 915, then the designated list entry is 804 the rightmost entry 916 with a list entry key object (311) equal 908 to the specified list-entry-key request operand (428).

If the key-request type (429) specifies a search for a less than or equal key 909, and a right to left direction (406) is specified 802 and 915, then the designated list entry is 804 the rightmost entry 916 with the greatest list entry key object (311) less than or equal 910 to the specified list-entry-key request operand (428).

If the key-request type (429) specifies a search for a greater than or equal key 911, and a right to left direction (406) is specified 802 and 915, then the designated list entry is the rightmost entry 916 with the smallest list entry key object (311) greater than or equal 912 to the specified list-entry-key request operand (428).

When a keyed list entry (311) is created the designated position is specified on the list-structure command by means of a list number (423), direction (406), and a list-entry key (428). If a "Move-store" is being performed, the designated position is specified by TDIR (478), TLN(453), and TLEK(452) if the MELT (479) is '1'; LEK object (311) if the MELT is '0'.

When (1) a list entry is located by keyed position, (2) entry creation or movement is requested, (3) a list entry with an equal key exists on the list, (4) a left-to-right direction is specified, then the designated target position is the position of the leftmost entry with the same key.

When (1) a list entry is located by keyed position, (2) entry creation or movement is requested, (3) a list entry with an equal key exists on the list, (4) a right-to-left direction is specified, then the designated target position is the position of the rightmost entry with the same key.

When (1) a list entry is located by keyed position, (2) entry creation or movement is requested, and (3) all entries on the list have a key greater than the specified key, the designated target position is the leftmost position in the list.

When (1) a list entry is located by keyed position, (2) entry creation or movement is requested, (3) at least one list entry on the list has a key less than the specified key, and (4) there is no list entry in the list that matches the specified key, then the designated target position is the first position after the rightmost entry with a key less than the specified list-entry key in the list.

A determination is made at 809 if the list exists. When the list exists ("Y" path from 809), a set of entries are identified—the set being the entire list 812 for unkeyed entries ("N" path from 811), and a subset of the list 813 for keyed entries ("Y" path from 811). The desired (or designated) position is identified based 814 on the direction parameter, left-to-right 815 selecting the immediate left of the leftmost entry in the set, and right-to-left 816 selecting the immediate right of the rightmost entry in the set. After selecting the location for the create or move, processing of the command continues 817.

Global Objects

The global objects identify the SES facility, describe its state, define its model-dependent limitations and summarize the status of its resources.

The fixed global controls are set at SES power-on reset and are not modified by any SES command.

The program-modifiable global controls are initialized at SES power-on reset and may be modified by subsequent SES commands.

The fixed global controls are summarized in the following table.

| Fixed Global Controls | Acronym |
| --- | --- |
| SID limit | SL |
| Total control space | TCS |

The program-modifiable global controls are summarized in the following table.

| Program-Modifiable Global Controls | Acronym |
| --- | --- |
| Free control space | FCS |
| Free space | FS |
| SID vector | SV |
| Total space | TS |

Free Control Space (FCS)

An object or field that specifies the amount of control storage which has not yet been assigned and is available for assignment to a structure.

The free-control-space value is initialized to the same value as the total-control-space value.

Free Space (FS):

An object or field that specifies the amount of storage which has not yet been assigned and is available for assignment to a structure. The free-space value is initialized to the same value as the total-space value and represents the largest structure size that may be allocated in the SES facility.

SID Limit (SL):

An object or field that specifies the maximum supported SID value.

SID Vector (SV):

An object or field that specifies the assigned SIDs.

Total Control Space (TCS):

An object or field that specifies the amount of storage defined in the SES control storage and available for the allocation of control objects for a structure.

Total Space (TS):

An object or field that specifies the amount of storage defined in the SES storage and available for the allocation of structures.

| List Limits | Acronym |
| --- | --- |
| List-number limit | LNL |
| Lock-table-entry-characteristic limit | LTEXL |
| User-identifier limit | UIDL |

List-Number Limit (LNL):

An object or field that specifies the maximum list number.

Lock-Table-Entry-Characteristic Limit (LTEXL):

An object or field that specifies the maximum size of a lock-table entry.

User-Identifier Limit (UIDL):

An object or field that specifies the maximum user identifier. The maximum-user-identifier value is the maximum number of list-structure users and list-notification vectors that can be attached to each list structure.

SES List Structure

A list structure consists of list-structure controls, user controls, and either a lock table, or a list set with list controls and list-entry controls, or both.

Each lock table consists of a sequence of one or more entries, which are numbered consecutively starting at zero. The list-structure type and lock-table-entry characteristic determines whether all the lock-table entries have a global-lock-manager object, a local-lock-managers object, or both.

The list-structure controls are initialized when the list structure is created. The list-structure controls contain the structure size, list-structure type, lock-table-entry count, nonzero-lock-table-entry count, lock-table-entry size, list count, list-element size, maximum data-list-entry size, maximum list-set-entry count, list-set-entry count, maximum list-set-element count, list-set-element count, user-identifier vector and user-structure controls.

The user controls are created and initialized when a list-structure user is attached. The user controls contain a list-notification token, system identifier, and user-attachment control.

Each list set consists of one or more lists, which are numbered consecutively starting at zero.

There are list controls associated with each list. The list controls contain a list-entry count or list-element count, a list-entry-count limit or list-element-count limit, a list-monitor table, a list-state-transition count, and a user list control.

Each list consists of a sequence of zero or more entries. The list-structure type determines whether all the list entries in the list set have a data list entry, an adjunct list entry, or both.

There are list-entry controls associated with each list entry. The controls contain list-entry-location information, a data-list-entry size, and a version number.

LIST STRUCTURE OBJECTS List Structure (111)

The possible list-structure objects consist of: (Reference numbers are to FIG. 2.)

List-structure controls 201
User controls 210
List controls 314
List-entry controls 315
Lock table 205
List set 202

List-Structure Controls

The fixed list-structure controls are initialized when the list structure is created and remain unchanged until it is deallocated.

The program-modifiable list-structure controls are initialized when the list structure is created. The program-modifiable control values may be changed by SES commands.

The fixed list-structure controls are summarized in the following table. (Those that are key to the present invention are shown in FIG. 2.)

| Fixed List-Structure Controls | Acronym |
| --- | --- |
| List count | LC |
| List-element characteristic | LELX |
| List-structure type | LST |
| Lock-table-entry characteristic | LTEX |
| Lock-table-entry count | LTEC |
| Maximum data-list-entry size | MDLES |
| Maximum list-set-element count | MLSELC |
| Maximum list-set-entry count | MLSEC |
| Structure size | SS |

The program-modifiable list-structure controls are summarized in the following table.

| Program-Modifiable List-Structure Controls | Acronym |
| --- | --- |
| List-set-element count | LSELC |
| List-set-entry count | LSEC |
| Nonzero-lock-table-entry count | NLTEC |
| User-identifier vector | UIDV |
| User-structure control | USC |

Note that in the definition of the terms below, the convention "<aaa>" is used in many of the figure references for defined terms. The arrow brackets "< >" indicate list structure usage of the defined term as a response operand on a list structure command. The "aaa" is the block number reference in the drawings attached to this specification. (2XX indicates FIG. 2; 3XX indicates FIG. 3; 4XX indicates FIG. 4; etc.)

List Count (LC): 211 433 <488>

An object or field that specifies the number of lists created.

List-Element Characteristic (LELX): 462 <485>

An object or field that specifies the number of bytes in each list element.

List-Set-Element Count (LSELC): <490>

An object or field that specifies the number of list elements that have been assigned to list entries or retry-data blocks, or both, in the list set.

List-Set-Entry Count (LSEC): <492>

An object or field that specifies the number of existing list entries in the list set.

List-Structure Type (LST): 204 447 <483>

A object or field that indicates the list objects created on allocation. A field contains a counter indicator (CI), a lock indicator (LI), a data indicator (DI), an adjunct indicator (AI), a name indicator (NI), and a key indicator (KI).

The counter indicator specifies that either:
a list-entry count and list-entry-count limit are defined or
a list-element count and list-element-count limit are defined.

The lock indicator specifies whether or not a lock table is created.

The data and adjunct indicators specify whether:
no list set is created,
list entries have adjunct only,
list entries have data only, or
list entries have data and adjunct in the list entries.

The name indicator specifies whether or not list entries are named.

The key indicator specifies whether or not the list entries are keyed.

Lock-Table-Entry Characteristic (LTEX): 425 <484>

An object or field that specifies the number of bytes in each lock-table entry.

Lock-Table-Entry Count (LTEC): 427 <487>

An object or field that specifies the number of lock-table entries allocated.

Maximum Data-List-Entry Size (MDLES): 437 <4B3>

An object or field that specifies the maximum size of the data list entry.

Maximum List-Set-Element Count (MLSELC): <481>

An object or field that specifies the maximum number of list elements that are available for assignment to list entries or retry-data blocks, or both, in the list set.

Maximum List-Set-Entry Count (MLSEC): <480>

An object or field that specifies the maximum number of possible list entries in a list set.

Nonzero-Lock-Table-Entry Count (NLTEC): <491>

An object or field that specifies the number of nonzero lock-table entries that exist in the structure.

Structure Size (SS): 466 <482>

An object or field that specifies the amount of storage allocated.

User-Identifier Vector (UIDV): <495>

An object or field that specifies the assigned UIDs.

User Structure Control (USC): 467 <494>

A field per structure defined by the user.

User Controls (210)

The user controls are created and initialized when a list-structure user is assigned and are deleted when the list-structure user is unassigned.

The user controls are summarized in the following table.

| User Controls | Acronym |
| --- | --- |
| List-notification token | LNT |
| System identifier | SI |
| User-attachment control | UAC |

List-Notification Token (LNT): 441

A value that specifies a list-notification vector to the system.

System Identifier (SI): <456>605 termed LNSID

A value specified by the program when a message path is activated. The system identifier is maintained in the message-path status vector and copied into the user controls when an attach-list-structure-user command is communicated over the message path.

User-Attachment Control (UAC): 475 <499>

A field per attached user defined by the user.

List Controls (314)

There is a list-controls object for every list created in a list structure. All the list controls except the list-entry-count limit and the list-element-count limit are initialized to zero when the list structure is created.

The list controls are summarized in the following table. (Significant controls are illustrated in FIG. 3.)

| List Controls | Acronym |
| --- | --- |
| List-element count | LELC |
| List-element-count limit | LELCL |
| List-entry count | LEC |
| List-entry-count limit | LECL |
| List-monitor table | LMT |
| List-state-transition count | LSTC |
| User list control | ULC |

List-Element Count (LELC): 312 <4B2>

An object or field that specifies the number of list elements currently in the list.

List-Element-Count Limit (LELCL): 313 4AA <4B4>

An object or field that specifies the maximum number of possible list elements in a list. This object is initialized to the maximum list-set-element count when a list structure is created.

List-Entry Count (LEC): 301 <446>

An object or field that specifies the number of list entries currently in the list.

List-Entry-Count Limit (LECL): 303 469 <459>

An object or field that specifies the maximum number of possible list entries in a list. This object is initialized to the maximum list-set-entry count when a list structure is created.

List-State-Transition Count (LSTC): <4B1>

An object or field that specifies the number of empty to not-empty list-state transitions that have occurred.

User List Control (ULC): 472 <497>

A field per list defined by the user.

List-Monitor Table (316)

The list-monitor table contains information used to process the list-notification vector of each user who has registered interest in the state transitions of the list.

The list-monitor table is a sequence of objects, called list-monitor-table entries.

The number of list-monitor-table entries is determined when the table is created and is equal to the maximum number of list-structure users. The list-monitor-table entries are numbered from zero to the user-identifier limit.

Each list-monitor-table entry has a list-monitoring-active-bit object, a list-notification-request-type object and a list-notification-entry-number object.

List-Monitoring-Active Bit (LMAB): 608

An object or field that specifies whether the user associated with the list-monitor-table entry is monitoring the list-state transitions of the list.

When a user is not monitoring a list, all previously issued list-notification commands on behalf of the associated user for this list are complete.

List-Notification-Request Type (LNRT): 445 602

An object or field that indicates whether the list-notification-vector summaries are to be updated when an empty to not-empty state transition occurs on a monitored list.

List-Notification-Entry Number (LNEN): 442 603

An object or field that specifies a list-notification-vector entry.

List-Entry Controls (315)

There is a list-entry-controls object for every list entry within a structure. The list-entry controls are initialized when a list entry is created and are deleted when the list entry is deleted.

The list-entry controls are summarized in the following table.

| List-Entry Controls | Acronym |
|---|---|
| Data-list-entry size | DLES |
| List-entry identifier | LEID |
| List-entry key/list-entry name | LEK/LEN |
| List number | LN |
| Version number | VN |

Data-List-Entry Size (DLES): 317 436 <451>

An object or field that specifies the size of the data list entry.

List-Entry Identifier (LEID): 308 404 <410>

An object or field that designates the list entry.

A list-entry identifier is unique to a list set and is assigned by the SES.

List-Entry Key (LEK): 311 428 <449>

An object or field that partially designates the position of the list entry in the list.

List-Entry Name (LEN): 310 405 <448>

An object or field that fully designates the position of the list entry in the list set. A list-entry name is unique to a list set at any particular instant and is provided by the program.

List Number (LN): 305 423 <430>

An object or field which designates the list that the list entry is in.

Version Number (VN): 304 411 <408>

An object or field that is conditionally compared and conditionally updated. The version number is initialized to zero when a list entry is created.

Lock Table (205)

The lock table is a sequence of objects, called lock-table entries <455>. The number of lock-table entries is determined when the table is created. The lock-table entries are numbered from zero to the lock-table-entry count less one. For a specific lock table, the entries have one size which is a power of 2 in the range of 1 to the maximum lock-table-entry size. The size of the largest lock table is limited by the free space and the size of all the controls required to support the list structure.

Each lock-table entry <455> has a global-lock-manager (GLM 207) object and an optional local-lock-managers (LLM 208) object.

A lock-table entry whose size is one byte has only a global-lock-manager object. When a lock-table-entry size is greater than one byte, the leftmost byte is the global-lock-manager object, and the remaining bytes form the local-lock-managers object. Lock tables with an entry size of one byte do not support local-lock managers. Lock tables with an entry size of at least two bytes do support local-lock managers.

The global-lock-manager object of a lock-table entry contains a field called a user identifier.

The local-lock-managers object of a lock-table entry contains a string of local-lock bits, where each bit represents a user identifier.

The lock-table objects have a value of zero when the table is allocated and may be modified by subsequent commands.

List Set (202)

The list set is a sequence of objects, called lists. The number of lists is determined when a list set is created. The lists are numbered from zero to the list count less one.

List (109)

A list is a sequence of objects, called list entries (302). The number of possible entries is determined when the list structure is created.

A list entry may also act as a retry-data block.

The relative position of a list entry in the sequence is determined when the entry is created and may be changed when any list entry is created, deleted, or moved.

A list entry is located by means of a list-entry identifier, list-entry name, or by position. The size of the largest list is limited by the free space and the size of all the controls required to support the list structure.

A list entry has up to two objects: a data list entry (306) and an adjunct list entry (309) 434 <4A1>, depending on the list-structure type.

A data-list entry consists of from one to MDLES list elements. The data-list-entry size is determined when the data-list entry is written. The adjunct-list-entry size is static.

A list entry exists when it is created and ceases to exist when it is deleted.

LIST STRUCTURE OPERANDS

The storage objects and processes are accessed using commands issued by the program. Each list-structure command has three parts:

A message-command block containing:
* Message header
* Request operands
* Reserved area A message-response block containing:
* Response descriptor
* Response operands
* Reserved area An optional data block, depending on the command The command descriptions contain the formats of the message-command blocks, message-response blocks, and data blocks.

This section defines the list-structure operands, except for those operands that are also objects. Operands that are also objects can be found under "Global Objects" or "List Structure Objects", with a FIG. 4 reference number beside them (indicating their use as either request or response operands).

Comparative Global-Lock Manager (CGLM): 415

A value that is compared to the global-lock-manager object.

Comparative Version Number (CVN): 421

A value that is compared to the version-number object.

Current Data Index (CDI): <4B0>

A value that indexes to the current list-entry name or list-entry identifier in the data block for the delete-list-entries command.

Data-Block Size (DBS): 4A3

A value that specifies the size of the data block.

Delete-Entries-Locator Type (DELT): 440 <4A6>

A value that indicates whether a list entry is located by list-entry identifier or list-entry name and whether or not the list numbers are compared for the delete-list-entries command.

Delete-List-Entries Count (DLEC): <4A7>

A value that specifies the number of deleted list entries.

Direction (DIR): 406

A value that indicates how the positions of the list entries are numbered relative to a designated position. The direction is either left to right, or right to left.

Entry-to-Element Ratio (ETELR): 461 <486>

A field consisting of two unsigned binary integers that specify the target for the relative number of list entries to list elements possible in the list set.

The integer specified in the first field divided by the sum of the two numbers represents the fraction of the total of the maximum list-set-element and the maximum list-set-entry count that consists of list entries. The integer specified in the second field divided by the sum of the two numbers represents the fraction of the total of the maximum list-set-element and the maximum list-set-entry count that consists of list elements associated with data list entries and retry-data blocks.

Ending Data Index (EDI): 4A9

A value that indexes to the last list-entry name or list-entry identifier in the data block for the delete-list-entries command.

Entry-Locator Type (ELT): 429

A value that indicates how a list entry is located for a read, replace, or delete operation, or as the source of a move operation, and whether list-number comparison is requested. The list entry is located by list-entry identifier, list-entry name, unkeyed position or keyed position.

For a create or the target of a move operation, the target list-entry position is located by keyed position when the entries are keyed, or by unkeyed position when the entries are not keyed.

Key-Request Type (KRT): 439

A value that indicates how a keyed list entry is located when an entry is replaced, moved, read or deleted. The type determines the relationship between the list-entry-key object and the list-entry-key operand.
   00 Equals list-entry-key operand
   01 Less than or equal to the list-entry-key operand
   10 Greater than or equal to the list-entry-key operand
   11 Invalid The key-request type is ignored when the entry-locator type is ignored or when the entries are not located by list-entry key.

List-Control Type (LCT): 468

The list-control type specifies either (1) the list-element-count or list-entry-count limit is written, depending on the counter indicator or (2) the user list control, both or neither are written.

List-Entry Type (LET): 435

A value that indicates whether data list entries, adjunct list entries, or both are read or replaced upon normal completion of the command execution.

Local-Lock Managers (LLM): 416

A value which identifies users with local interest in the lock-table entry.

Local-Lock Bit (LLB): 413

A value that is written to a local-lock manager.

Lock-Request Type (LRT): 412

A value that indicates the type of lock request. The lock request type specifies
   (1) that No lock process is requested,
   (2) to compare the global-lock managers,
   (3) to replace the global-lock manager,
   (4) to replace a local-lock manager,
   (5) to replace the global-lock and local-lock managers.

Lock-Table-Entry Number (LTEN): 414 <431>

A value that specifies an entry in a lock table.

Move-Entry-Locator Type (MELT): 479

A value that indicates which key is used when a keyed list entry is moved.
The move-entry-locator type specifies whether
The target key is the LEK in the list entry or the TLEK in the MCB.

Read-List-Entries Count (RLEC): <4A2>

A value that specifies the number of list entries read.

Read-List Type (RLT): 4AB

A value that indicates whether list-entry controls, data, list entries, adjunct list entries, or any combination are read upon normal completion of the command execution.

Response Code (RC): 407

The response code indicates the result of executing a list command.

Restart Token (RT): 4A4 <4A5>

A value that controls the reading or deleting of list entries on the read-list-set and delete-list-set commands.

Retry Index (RX): 4AC

A VALUE that designates either a particular retry buffer or none.

Retry Version Number (RVN): 4AD <4A0>

A value that specifies the version number stored in the retry buffer.

Starting Data Index (SDI): 4A8

A value that indexes to the first list-entry name or list-entry identifier in the data block for the delete-list-entries command.

Target Direction (TDIR): 478

A value that indicates how the positions of the list entries are numbered relative to a designated target position for a moved list entry. The target direction is either left to right or right to left.

Target List-Entry Key (TLEK): 452

A value that partially specifies the targeted position to which a list entry is moved.

Target List Number (TLN): 453

A value that designates the list to which a list-entry is moved.

User Identifier (UID): 418<419>

A value that identifies a user.

When the lock-request type specifies global-lock-manager and local-lock-managers replacement, the user identifier specifies a global-lock manager. When the lock-request type specifies global-lock-manager replacement, the user identifier specifies a global-lock manager and, when local-lock managers exist, it also specifies a local-lock manager. When the lock-request type specifies local-lock-manager replacement, The user identifier specifies a local-lock manager.

Version-Request Type (VRT): 422

A value that indicates the type of version-number request to (1) compare the version numbers or (2) to increment, decrement, or replace the version number, or both, or neither.

Write-Request Type (WRT): 420

A value that indicates the type of write request. The writer-request type specifies
(1) to replace a list entry,
(2) to Create a list entry, or
(3) to replace or create a list entry.

LIST STRUCTURE PROCESSES

The following processes may be invoked by the SES list-structure commands. The set of processes invoked by a command are listed in the command description.

Allocating a List Structure

The user structure control is updated on the allocate-list-structure command. A list structure is created on the first successful invocation of the allocate-list-structure command for a structure that does not already exist. A list structure is initially allocated after one or more successful invocations of the allocate-list-structure command. These operations are referred to generically as list-allocation processes.

Creating a List Structure

When a list structure is created, the list-structure type determines the attributes of the created structure. The list-structure type has indicators for each of the following: counters, locks, data, adjunct, name, and key.

When the counter indicator in the list-structure type specifies that the list-entry count and list-entry-count limit are defined and allocation is successful, the list controls for each list contain a list-entry count and a list-entry-count limit. When the counter indicator in the list-structure type specifies that the list-element count and list-element-count limit are defined and allocation is successful, the list controls for each list contain a list-element count and a list-element-count limit.

When the lock indicator in the list-structure type specifies that a lock table is created and allocation is successful, a lock table is created with a width as specified by the lock-table-entry characteristic and a length as specified by the lock-table-entry count.

When the data indicator in the list-structure type specifies that list entries have data and allocation is successful, storage is allocated for the creation of list elements. The size of the list elements is specified by the list-element characteristic.

When the adjunct indicator in the list-structure type specifies that list entries have adjunct and allocation is successful, each list entry created in the structure has an adjunct list entry.

When the name indicator in the list-structure type specifies that the list entries have names and allocation is successful, each list entry created in the structure has a list-entry name associated with it.

When the key indicator in the list-structure type specifies that the list entries have keys and allocation is successful, each list entry created in the structure has a list-entry key associated with it.

When a list structure is created, (1) the free-space and free-control-space global controls are updated, (2) the appropriate field in the structure-identifier vector is set, and (3) the list-structure and list controls are initialized.

Deallocating a List Structure

When a list structure is deallocated, the storage is freed, the free-space and free-control-space global controls are updated, the appropriate field in the structure-identifier vector, and all the list-monitoring-active objects are reset.

Attaching a List-Structure User

A list-structure user is attached by means of the attach-list-structure-user command.

When a list-structure user is attached, the user controls are initialized, the appropriate field in the user-identifier vector is updated, and the user is placed in the attached state.

Detaching a List-Structure User

A list-structure user is detached after one or more successful invocations of the detach-list-structure-user command.

When a list-structure user is detached, the list-monitoring-active object has been updated in all the list-monitor-table entries associated with the user. The user controls are deleted and the assigned field in the user-identifier vector is updated.

The list-monitoring-active bit is updated only after all list-notification commands issued to the associated list and user are complete.

Comparing Global-Lock Managers

Global-lock-manager comparison always occurs before a lock-table entry is written or may occur before a list entry is created, replaced, read, moved or deleted, depending on the command and lock-request type.

The global-lock-manager object is compared with the comparative-global-lock manager specified. When they match, the global-lock-manager comparison succeeds, and the command continues. When they do not match, the global-lock-manager comparison fails, and an indicative response code is returned.

Comparing Local-Lock Managers

Local-lock-manager comparison may occur before a lock-table entry is written or before a list entry is created, replaced, read, moved or deleted, depending on the command code and lock-request type.

There are two lock-request types that cause local-lock-manager comparison: global-lock-manager replacement, and local-lock-manager replacement.

When a local-lock-manager object exists and a global-lock-manager replacement is requested, the local-lock-manager-object value is ANDed with a mask of all ones except for the local-lock bit corresponding to the user identifier specified. This ANDed value is then compared with zero. When they match, the local-lock-manager comparison succeeds. When they do not match, the local-lock-manager comparison fails.

When a local-lock-manager object exists and a local-lock-manager replacement is requested, the local-lock bit corresponding to the user identifier specified is compared with the local-lock-bit value specified. When they match, the local-lock-manager comparison fails. When they do not match, the local-lock-manager comparison succeeds.

When the local-lock-manager comparison fails, an indicative response code is returned.

Writing a Lock-Table Entry

One or both of the objects contained within a lock-table entry may be replaced, depending on the lock-request type specified.

A global-lock manager may be replaced when a lock-request type specifies to replace the global-lock-manager or to replace the global-lock and local-lock managers and the global-lock-manager comparison succeeds.

One or more local-lock managers are replaced when a lock-request type specifies to replace a local-lock-manager or to replace the global-lock and local-lock managers and the global-lock-manager comparison succeeds.

Replacing a Global-Lock Manager

The global-lock-managers are compared and the local-lock-managers may be compared when global-lock-manager replacement is requested.

When the global-lock-manager comparison succeeds, the global-lock manager may be replaced with the user identifier specified, regardless of whether or not the local-lock-manager comparison succeeds.

Replacing a Local-Lock Manager

The global-lock-managers and local-lock-managers are compared when local-lock-manager replacement is requested.

When the global-lock-manager comparison succeeds, the local-lock bit corresponding to the user identifier specified may be replaced with the local-lock-bit value specified, regardless of whether or not the local-lock-manager comparison succeeds.

Replacing the Global-Lock and Local-Lock Managers

The global-lock-managers are compared when global-lock and local-lock-managers replacement is requested.

When the global-lock-manager comparison succeeds, the global-lock manager may be replaced with the user identifier specified and the local-lock managers are replaced with the local-lock managers specified.

Locating a List Entry or List-Entry Position

The designated list entry is the first entry relative to the designated position before an entry is deleted, when an entry is read, replaced or moved, or after an entry is created. The designated position is specified (1) by an unkeyed position, (2) by a keyed position, (3) by a list-entry identifier, or (4) by a list-entry name, depending on the entry-locator type specified and the type of structure allocated.

A list entry is located by unkeyed position when an entry-locator type specifies locate by unkeyed position or an unkeyed list entry is created or moved; that is, the designated position is specified by means of a list number and a direction. A list entry is located by keyed position when the list entries are keyed and an entry-locator type specifies locate by keyed position or a keyed list entry is created or moved; that is, the designated position is specified by means of a list number, direction, and a list-entry key. A list entry is located by list-entry identifier when an entry-locator type specifies locate by list-entry identifier; that is, the designated position is the position of the identified list entry. A list entry is located by list-entry name when the list entries are named and an entry-locator type specifies locate by list-entry name; that is, the designated position is the position of the named list entry.

A list entry has a position relative to the designated position. When a list entry is created, moved, or deleted, the relative positions of the successive list entries are changed. In these cases, the first entry is the designated list entry and successive entries are determined by the direction specified.

Regardless of how a list entry is located, when a left-to-right direction is specified, the last entry is the rightmost entry in the list, and when a right-to-left direction is specified, the last entry is the leftmost entry in the list.

When a list entry is located by list-entry identifier, the designated list entry is the identified list entry.

When a list entry is located by list-entry name, the designated list entry is the named list entry.

When a list entry is located by unkeyed position and a left-to-right direction is specified, the designated list entry is the leftmost entry in the list. When a list entry is located by unkeyed position and a right-to-left direction is specified, the designated list entry is the rightmost entry in the list.

When (1) a list entry is located by keyed position, (2) entry deletion, read, replacement or movement is requested, (3) a list entry with an equal key, a less than or equal key, or a greater than or equal key, exists on the list, depending on the key-request type, and (4) a left-to-right direction is specified, then the designated source list entry is the leftmost entry with a key equal, with the largest key less than or equal, or with the smallest key greater than or equal to the specified list-entry-key request operand.

When (1) a list entry is located by keyed position, (2) entry deletion, read, replacement or movement is requested, (3) a list entry with an equal key, a less than or equal key, or a greater than or equal key, exists on the list, depending on the key-request type, and (4) a right-to-left direction is specified, then the designated list entry is the rightmost entry with a key equal, with the largest key less than or equal, or with the smallest key greater than or equal to the specified list-entry-key request operand.

When (1) a list entry is located by keyed position, (2) entry creation or movement is requested, (3) a list entry with an equal key exists on the list, (4) a left-to-right direction is specified, then the designated target position is the position of the leftmost entry with the same key.

When (1) a list entry is located by keyed position, (2) entry creation or movement is requested, (3) a list entry with an equal key exists on the list, (4) a right-to-left direction is specified, then the designated target position is the position of the rightmost entry with the same key.

When (1) a list entry is located by keyed position, (2) entry creation or movement is requested, and (3) all entries on the list have a key greater than the specified key, the designated target position is the leftmost position in the list.

When (1) a list entry is located by keyed position, (2) entry creation or movement is requested, (3) at least one list entry on the list has a key less than the specified key, and (4) there is no list entry in the list that matches the specified key, then the designated target position is the first position after the rightmost entry with a key less than the specified list-entry key in the list.

When a list entry is located by list-entry identifier or by list-entry name, the designated position exists when the list entry exists.

When a list entry is located by unkeyed position, the designated position exists when the list exists.

When a list entry is located by keyed position and entry creation or movement is requested, the designated target position exists when the list exists.

When a list entry is located by keyed position and entry creation is not requested, the designated position exists when a list entry in the list has a key that is equal, greater than or equal, or less than or equal to the specified list-entry key in the list, depending on the key-request type.

When the designated position does not exist, an indicative response code is returned.

Comparing List Numbers

When the of the entry-locator type specifies list-number comparison and a list entry is not created, a list-number comparison is requested.

When list-number comparison is requested, the list-number object is compared with the list number specified. If they do not match, the list-number comparison fails, and an indicative response code is returned.

Comparing Counts

There are three sets of counts that are compared, depending on the process requested: the list-set-entry counts, the list-set-element counts, and the list entry counts or list-element counts, depending on the count indicator.

Comparing List-Element Counts

The list-element-count-limit object is compared with the list-element-count operand whenever a list entry is written or moved and the count indicator in the list-structure type is one. If the sum of the list-element count and the number of additional list elements required exceeds the list-element-count limit, the list is full. When the list is full and a write or move operation is requested, an indicative response code is returned.

The list-element-count limit or list-entry-count limit is updated on a write-list-controls command, depending on the list-control type.

Comparing List-Entry Counts

The list-entry-count-limit object is compared with the list-entry-count operand whenever a list entry is created or moved and they exist. A list is full when the number of list entries created matches or exceeds the list-entry-count limit. When the list is full and a create or move operation is requested, an indicative response code is returned.

Comparing List-Set-Element Counts

The maximum list-set-element-count object is compared with the list-set-element-count object whenever a data list entry is written. If the sum of the list-set-element count and the number of additional list elements required exceeds the maximum-list-set-element count, the list set is full. When the list set is full, and list-entry creation or retry-data block creation is requested, an indicative response code is returned.

Comparing List-Set-Entry Counts

The maximum list-set-entry-count object is compared with the list-set-entry-count object whenever a list entry is created. A list set is full when the number of list entries created and not deleted matches the maximum list-set-entry count. When a list set is full and list-entry creation or retry-data block creation is requested, an indicative response code is returned.

Updating Counts

There are three types of counts that are updated, depending on the process requested: the list-set-entry count, the list-set-element count, and the list-entry count or list-element count, depending on the count indicator.

Updating the List-Element Counts

The list-element counts are updated whenever a list entry is created, deleted, or moved to another list or replaced and the number of list elements associated with the list entry is changed or a retry-data block is created or deleted. When the list entry is also the retry-data block, the count is at most incremented or decremented by the number of list elements associated with the list entry.

Updating the List-Entry Counts

The list-entry counts are updated whenever they exist and a list entry is created, deleted, or moved to another list.

Updating the List-Set-Element Count

The list-set-element count is updated whenever a list entry is created, deleted, or replaced and the number of list elements associated with the list entry is changed or a retry-data block is created or deleted. When the list entry is also the retry-data block, the count is at most incremented or decremented by the number of list elements associated with the list entry.

Updating the List-Set-Entry Count

The list-set-entry count is updated whenever a list entry is created or deleted.

Comparing Version Numbers

Version numbers may be compared when an entry is replaced, read, moved, or deleted, depending on the version-request type specified. When a version-request type specifies to compare the version numbers, the version-number object is compared with the comparative-version-number request operand. When they match, processing continues. When they do not match, the version-number comparison fails, and an indicative response code is returned.

Updating a Version Number

A version number may be updated when an entry is created, replaced, read, or moved, depending on the version-request type specified.

When a version-request type of specifies to decrement the version number, the version number is decremented by one. When a version-request type specifies to increment the version number, the version number is incremented by one. When a version-request specifies to replace the version number, the version-number object is set to the version-number request operand.

Writing a List Entry

A list entry may be written on a write-list-entry or a write-and-move-list-entry command. A list entry is written when an entry is created or replaced.

When a list entry is created, the data and adjunct indicators within the list-structure-type object are used to determine whether or not to write the data or adjunct list entry, or both. When a list entry is replaced, the data and adjunct indicators within the list-entry-type operand are used to determine whether or not to write the data or adjunct list entry, or both.

When the data indicator specifies that the list entries have data, the data list entry is written from the data block. When the adjunct indicator specifies that the list entries have adjunct, the adjunct list entry is written from the adjunct-list-entry-value request operand.

When the data list entry is replaced and the data-list-entry-size operand is smaller than the data-list-entry-size object, the data-list entry is contracted to the new size, the data block is stored in the data-list entry, and the data-list-entry-size object in the list-entry controls is updated with the value of the data-list-entry-size operand. When the data list entry is replaced and the data-list-entry-size operand is larger than the data-list-entry-size object, the data-list entry is expanded to the new size, the data block is stored in the data-list entry, and the data-list-entry-size object in the list-entry controls is updated with the value of the data-list-entry-size operand.

Creating a List Entry

List-entry creation is requested on a write-list-entry command, depending on the write-request type specified.

When a write-request type specifies to create a list entry, list-entry creation is unconditionally requested. When a write-request type specifies to replace or create a list entry, list-entry creation is conditionally requested; that is, the list-entry creation is requested when the designated list entry does not exist.

When the list set and list is not full and list-entry creation is requested, a list entry may be created. When a list entry is created, the list-set-entry count and when it exists, the associated list-entry count are each incremented by one. When a list entry is created, the list-set-element count and when it exists, and the associated list-element count are each increased by the value of the data-list-entry size.

A list entry is created at the first entry position relative to the designated position, and the relative position of all succeeding entries is increased by one.

Replacing a List Entry

A list entry may be replaced on a write-list-entry command.

When a write-request type specifies to replace a list entry or to replace or create a list entry and the designated list entry exists, the list entry may be replaced.

When a list entry is replaced, the list-set-element count and when it exists, the associated list-element count are each increased or decreased by the change in the data-list-entry size.

The position of an entry is not affected when it is replaced.

When a write-request type specifies to replace a list entry and the designated list entry does not exist, an indicative response code is returned.

Reading a List Entry

A list entry may be read on a read-list-entry, move-and-read-list-entry, or read-and-delete-list-entry command, and one or more list entries may be read on a read-list or read-list-set command.

When the list-entry type specifies data list entries, one or more data list entries may be read into the data area, depending on the command executed. When the list-entry type specifies adjunct list entries, one adjunct list entry may be read into the adjunct-list-entry-value response operand, or one or more adjunct list entries are read into the data area, depending on the command executed.

When a read-list or read-list-set command is executed, the adjunct or data list entries are always read into the data area. Otherwise, when any other command that does a read operation is executed, the adjunct list entry is read into the response operand.

The position of an entry is not affected by a read operation.

Moving a List Entry

A list entry may be moved on a move-list-entry, a write-and-move-list-entry, or a move-and-read-list-entry command. List entries may be moved between lists or to the same list within a list set.

A list entry is moved from the first entry position relative to the designated position, and the relative position of all succeeding entries is decreased by one. A list entry is moved to the first entry position relative to the targeted position, and the relative position of all succeeding entries is increased by one.

When a list entry is moved from one list to another and list-entry counts exist, the list-entry count of the source list is decremented by one and the list-entry count of the target list is incremented by one.

When a list entry is moved from one list to another and list-element counts exist, the list-element count of the source list is decreased by the value of the data-list-entry size and the list-element count of the target list is increased by the same amount.

Deleting a List Entry

A list entry may be deleted on a delete-list-entry or a read-and-delete-list-entry command and one or more list entries may be deleted on a delete-list-set or delete-list-entries command.

An entry is deleted at the first entry position relative to the designated position, and the relative position of all succeeding entries is decreased by one.

When a list entry is deleted, the list-set-entry count and when list-entry counts exist, the associated list-entry count are each decremented by one.

When a list entry is deleted, the list-set-element count and when list-element counts exist, and the associated list-element count are each decreased by the value of the data-list-entry size.

Writing the Retry Buffer

When the retry index specifies a retry buffer, the retry-version-number request operand and all the response operands except for the response descriptor are stored in the retry-information portion of the retry buffer specified by the retry index. When the retry index specifies a retry buffer and a data list entry is read, the data list entry is also stored in the retry-data-block portion of the retry buffer specified by the retry index.

Notifying a List Monitor

Processing of a list-notification command consists of three operations; message-path selection, initiation, and completion.

When a list-state transition occurs, one or more list-notification commands are initiated for each user who is monitoring the list to the system which attached the user. All the list-notification commands initiated as a result of a list-state transition are initiated before the command that caused the list-state transition is completed.

The list-notification command provides the information necessary for the system to update one list-notification entry and, when requested, the associated list-notification summaries, to reflect the new list state.

A user becomes a list monitor by registering with the list by means of the register-list-monitor command. A user ceases to be a list monitor by deregistering from the list by means of the deregister-list-monitor command or by detaching from the list structure by means of the detach-list-structure-user command.

A list-notification command issued to a system for a user as a result of a not-empty-to-empty list-state transition must complete before another list-notification command on behalf of the same list and user that specifies the opposite list-state transition may be issued.

All SES list-structure commands capable of adding, deleting, or moving a list entry execute the list-monitor-notification process for each user monitoring a list that changes state.

This section defines the list-structure operands for the list notification command.

| List-Notification Operands | Acronym |
|---|---|
| Non-empty state change | NESC |
| List-notification-entry number | LNEN |
| List-notification token | LNT |
| Summary update | SU |

Non-empty State Change (NESC): 443

A value that indicates that the list transition from the associated list notification bit vector entry was either an empty to not-empty transition (value is one) or a not-empty to empty transition (value is zero).

List-Notification-Entry Number (LNEN): 442

An object or field that specifies a list-notification-vector entry.

List-Notification Token (LNT): 441

A value that specifies a list-notification vector to the system.

Summary Update (SU): termed LNRT 445

A value that indicates whether the list-notification-vector summaries are to be updated when an empty to not-empty state transition occurs on a monitored list.

List structure commands

This section summarizes the list structure commands that are supported by the SES facility 110. List structure commands are direct commands which are communicated from the CPC 101–104 to the message processing function 113 of the SES via the Send Message CPU instruction. List structure commands are categorized as follows:

Structure commands which allocate, read, and write list structures 111, list structure controls 201, and list controls 314.

User commands which allow a user (program) to identify itself to the SES, and to register as a monitor of specific lists 109 in the SES.

Lock only commands which support read, write, and clear operations on lock table objects 206.

Single-list-entry commands which support read, write, move and delete operations on one list entry object 302.

Multiple-list-entry commands, which support read and delete operations on multiple list objects/entries 302.

Structure Commands

The structure commands are:
Allocate-list-structure (ALST),
Deallocate-list-structure (DLST),
Read-list-structure-controls (RLSC),
Read-list-controls (RLC), and
Write-list-controls (WLC).

ALST Command

The ALST command creates (allocates) a list structure 111.

The allocate-list-structure command creates a list structure when the structure identifier is not assigned and there is sufficient free space and sufficient free control space available in the SES for creating the requested lock-table entries, lists and associated controls, and at least one list entry when a list set is requested.

The allocate-list-structure command continues the initial allocation of a list structure when the structure identifier is assigned and initial allocation of the structure has not completed.

When the structure is allocated, a checkpoint is established and the maximum list-set-entry count, maximum list-set-element count, allocated structure size and an indicative response code are returned in the response operands.

When a model-dependent time period has elapsed before the allocation process is completed, the maximum list-set-entry count, maximum list-set-element count, allocated structure size and an indicative response code is returned in the response operands.

When insufficient free control space but sufficient free space is available in SES for the structure, an indicative response code is returned in the response operand.

When insufficient free space is available in SES for the structure, an indicative response code is returned in the response operand.

When the initial allocation of the list structure has not completed, the initial allocation is continued.

DLST Command

The DLST command deallocates the list structure 111 associated with the specified structure identifier. The designated list structure is deallocated and an indicative response code is returned in the response operand. When a model-dependent time period has elapsed before the deallocation process is completed, an indicative response code is returned in the response operand.

RLSC Command

The RLSC command returns (in the response operands) the list-structure controls 201 associated with the specified structure identifier.

RLC Command

The RLC command returns (in the response operands) the list controls 314 associated with the specified structure identifier and list number.

WLC Command

The WLC command writes/updates the list controls 314 associated with the specified structure identifier and list number.

The write-list-controls command writes the list controls, depending on the list-control type.

User commands

The user commands are:
Attach-list-structure-user (ALSU),
Detach-list-structure-user (DLSU),
Register-list-monitor (RLM),
Deregister-list-monitor (DLM), and
Read-user-controls (RUC).

ALSU Command

The ALSU command executes the attachment process.

Figure 10:
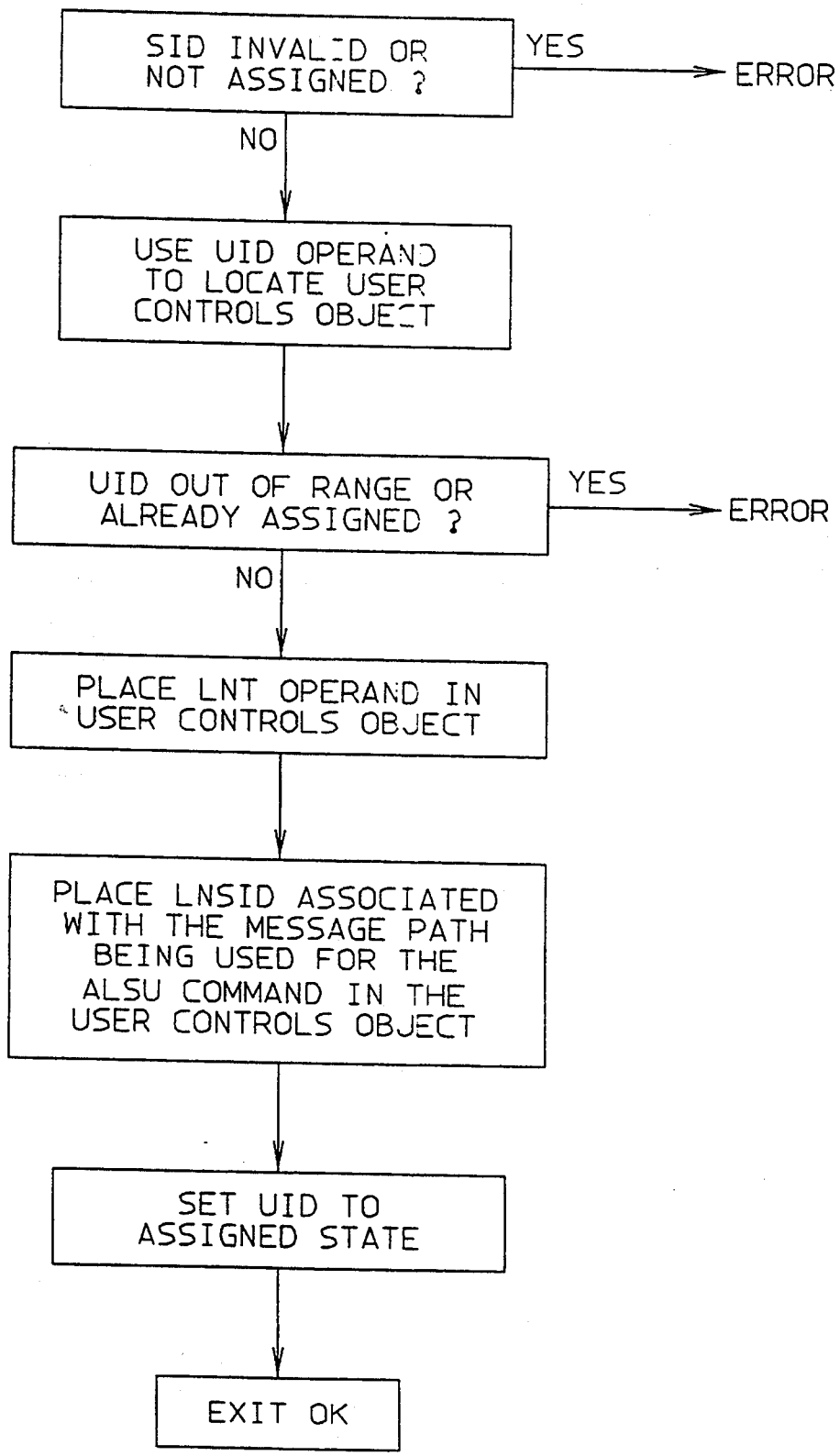
FIG. 10 is a flowchart illustrating the Attach List Structure User (ALSU) command.

FIG. 10 is a flowchart showing the process for the ALSU command.

The attach-list-structure-user command attaches the list-structure user.

When the list-structure user is attached, an indicative response code is returned in the response operand.

DLSU Command

The DLSU command completes the detachment process and changes the state of the user identifier 418 to unassigned.

Figure 11:
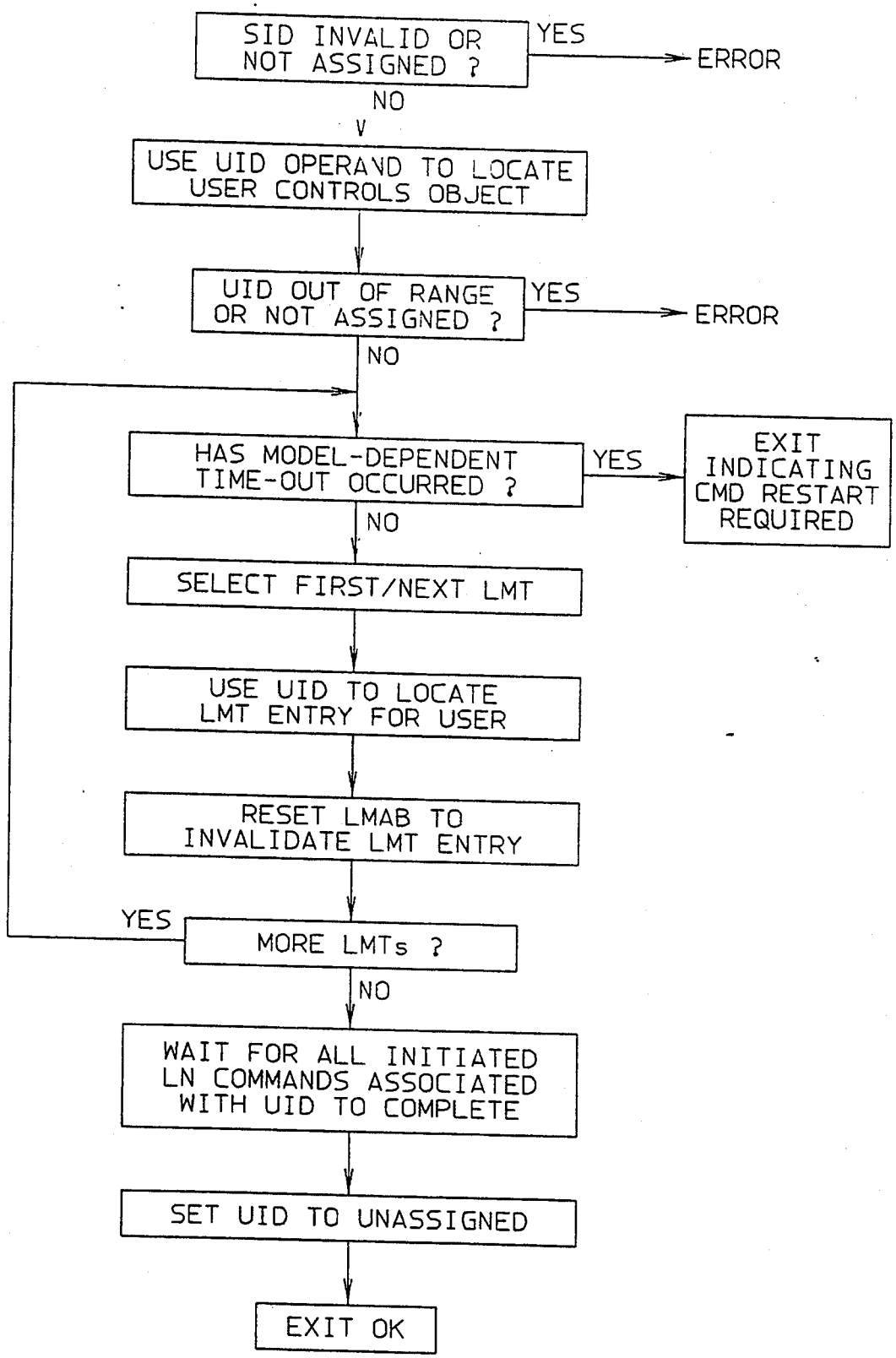
FIG. 11 is a flowchart illustrating the Detach List Structure User (DLSU) command.

FIG. 11 is a flowchart showing the process for the DLSU command.

The detach-list-structure-user command continues detaching the list-structure user.

The detach-list-structure-user command completes detaching the list-structure user when the list-monitoring-active bit of all the list-monitor-table entries associated with the list-structure user is reset. After processing all list monitor tables, the DLSU command waits for all initiated LN commands associated with the list structure user to complete 1501.

The user identifier is placed in the unassigned state.

When the list-structure user is detached, an indicative response code is returned in the response operand.

When the model-dependent time period has elapsed before the detachment process is complete, an indicative response code is returned in the response operand.

RLM Command

Figure 12:
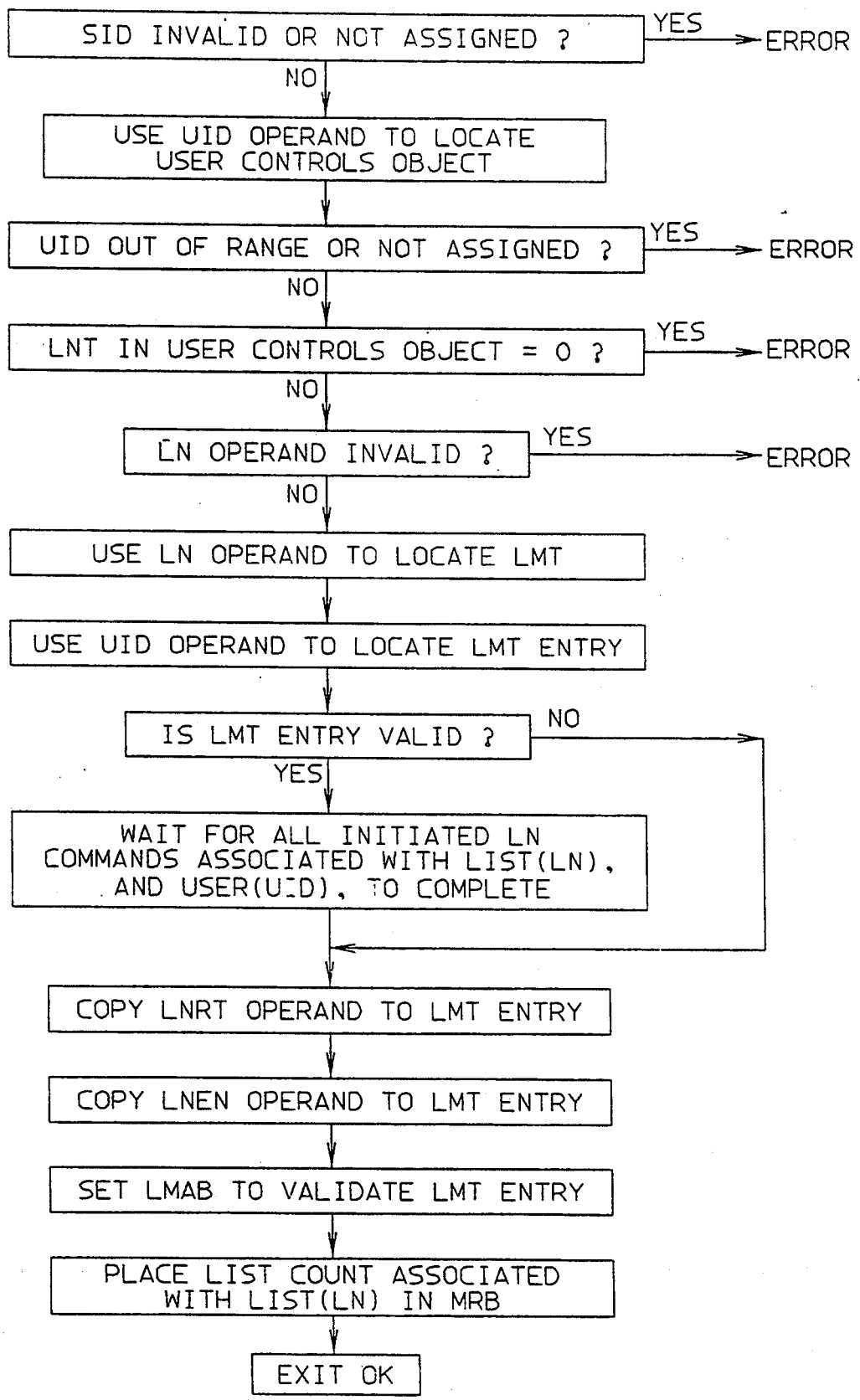
FIG. 12 is a flowchart illustrating the Register List Monitor (RLM) command.

The RLM command registers a list structure user as a list monitor by updating the list monitor table 316. It is described in FIG. 12.

When the specified list-structure user is attached with a valid list-notification token, the list-monitoring-active field is updated and the list-notification-request type and list-notification entry number are updated in the list-monitor-table entry of the specified list and user, and the list-entry count or the list-element count and an indicative response code are returned in the response operands.

When the specified list-structure user is attached with an invalid list-notification token, an indicative response code is returned in the response operand.

DLM Command

Figure 13:
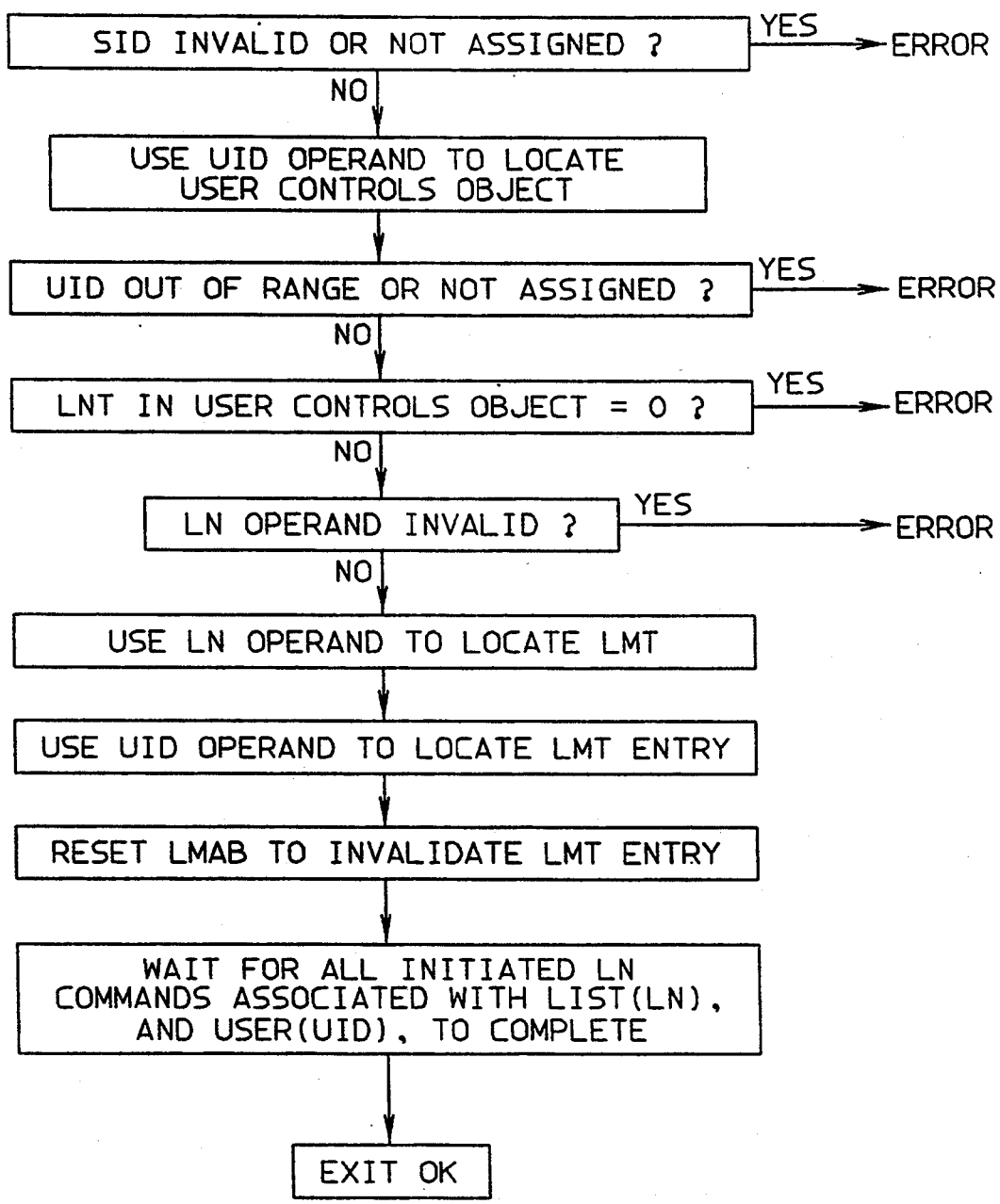
FIG. 13 is a flowchart illustrating the Deregister List Monitor (DLM) command.

The DLM command deregisters a list structure user as a list monitor. It is described in FIG. 13.

The list-monitoring-active field is updated in the list-monitor-table entry of the specified list and user. Then the DLM command waits for all initiated LN commands associated with the list and user to complete 1701. An indicative response code is returned in the response operand.

RUC Command

The RUC command returns the user controls 210 in the response operands.

Lock-only Commands

The lock-only commands are:
Read-lock-table-entry (RLTE),
Write-lock-table-entry (WLTE),
Read-next-lock-table-entry (RNLTE), and
Clear-lock-table (CLT).

RLTE Command

The RLTE command returns the lock-table-entry value of the lock-table-entry 206 specified by the structure identifier and lock-table-entry number.

The lock-table-entry value of the lock-table entry specified by the structure identifier and lock-table-entry number and an indicative response code are returned in the response operands.

WLTE Command

The WLTE command compares the global-lock managers 207 and conditionally replaces the global-lock managers, the local-lock managers 208 or both.

When a global-lock manager is replaced and there are no other local-lock managers or when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then an indicative response code is returned in the response operand.

When global-lock manager comparison fails, an indicative response code is returned in the response operand.

RNLTE Command

The RNLTE command conditionally reads the next nonzero lock-table entry 206.

The read-next-lock-table-entry command scans the lock-table entry starting at the lock-table-entry number specified and proceeds sequentially in ascending lock-table-entry number order until a nonzero entry or the end of the lock table is reached, or a model-dependent time period elapses.

When the end of the lock table is reached without encountering a nonzero entry, the last lock-table-entry number and an indicative response code are returned in the response operands.

When a model-dependent time period has elapsed before the end of the lock table is reached, an indicative response code is returned in the response operand.

When a nonzero lock table entry is reached, the lock-table-entry number, the lock-table-entry value, and response code 2 are returned in the response operands.

CLT Command

The CLT command zeros one or more lock-table entries 206.

The clear-lock-table command zeros the lock-table entries starting at the lock-table-entry number specified and proceeds sequentially in ascending lock-table-entry-number order until a model-dependent time period elapses or the end of the lock table is reached.

When the end of the lock table is reached before a model-dependent time period has elapsed, an indicative response code is returned in the response operand.

When a model-dependent time period has elapsed before the end of the lock table is reached, the lock-table-entry-number of the next entry in the sequence that has not been cleared and an indicative response code is returned in the response operand.

Single-list-entry Commands

The single-list-entry commands are:
Read-list-entry (RLE),
Write-list-entry (WLE),
Move-list-entry (MLE),
Delete-list-entry (DLE),
Write-and-move-list-entry (WMLE),
Move-and-read-list-entry (MRLE),
Read-and-delete-list-entry (RDLE),

RLE Command

The RLE command conditionally compares the list numbers 305 and 423, compares the version numbers 304 and 421, conditionally updates the version number 304 with 411, compares the global-lock managers 207 and 415, compares the local-lock managers 208 and 416, writes the lock-table entry 206, returns the designated list-entry controls 315 and list entry values 306 and 309, and conditionally updates the retry buffer.

The list entry is located and, when requested, the list numbers are compared, the version numbers are compared, the version number is updated, or the global-lock managers are compared, or any combination of the preceding processes is performed. When the global-lock managers are compared, the local-lock managers may be compared. In order for a list entry to be read, all of these processes, when requested, must succeed. In order for a lock-table entry to be written, all of these processes except for local-lock manager comparison, when requested, must succeed.

The retry buffer is written, depending on the retry index.

When a list entry is read, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock mangers are replaced, an indicative response code is returned in the response operand.

When the global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated-list-entry controls and an indicative response code are returned in the response operands.

When the designated list entry exists but the requested list-number comparison fails, the designated-list-entry controls and an indicative response code of are returned in the response operands.

When the designated list entry does not exist, an indicative response code is returned in the response operand.

WLE Command

The WLE command conditionally compares the list numbers 305 and 423, compares the list-set-entry counts, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, replaces or creates the designated list entry 302, returns the designated list-entry controls 315, and conditionally updates the retry buffer.

The designated list entry or position is located and, when requested, the version number is updated, the global-lock managers are compared, or the list entry is replaced or created, or any combination of the preceding processes is performed. When the global-lock managers are compared, the local-lock managers may be compared. When list-entry creation is requested, the list-set-entry counts and the list-entry counts or list-element counts are compared. When list-entry replacement is requested, the list numbers and version numbers may be compared. When the global-lock managers are compared, the lock-table entry may be written. In order for a list entry to be written, these processes, when requested, must succeed. In order for a lock-table entry to be written, all of these processes except for local-lock manager comparison, when requested, must succeed.

When a list entry is created and a list-state transition results, the list monitors are notified. The list-notification command does not have to complete before the write-list-entry command completes.

The retry buffer is written, depending on the retry index.

When a list entry is written, the list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the list set is full and list-entry creation is requested, an indicative response code is returned in the response operand.

When the designated list entry exists but the requested list-number comparison fails, the designated list-entry controls and an indicative response code of are returned in the response operands.

When the designated list entry does not exist, an indicative response code is returned in the response operand.

When the list-entry name already exists and list-entry creation is requested, an indicative response code is returned in the response operand.

MLE Command

The MLE command conditionally compares the list numbers 305 and 423, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry controls 315, and conditionally updates the retry buffer.

The list entry and the designated target position are located, the list-entry counts or list-element counts are compared, and, when requested, the list numbers are compared, the version numbers are compared, the version number is updated, or the global-lock managers are compared, or any combination of the preceding processes is performed. When the global-lock managers are compared, the local-lock managers may be compared. In order for a list entry to be moved, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the move-list-entry command completes.

The retry buffer is written, depending on the retry index.

When a list entry is moved, the designated-list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

DLE Command

The DLE command conditionally compares the list numbers 305 and 423, compares the version numbers 304 and 421, conditionally replaces the version number 304 with 411, compares the global-lock managers 207 and 415, compares the local-lock managers 208 and 416, writes the lock-table entry 206, deletes the designated list entry 302, returns the designated list-entry controls 315, and conditionally updates the retry buffer.

The list entry is located and, when requested, the list numbers are compared, the version numbers are compared, or the global-lock managers are compared, or any combination of the preceding processes is performed. When the global-lock managers are compared, the local-lock managers may be compared. In order for a list entry to be deleted, these processes, when requested, must succeed. In order for a lock-table entry to be written, all of these processes except for local-lock manager comparison, when requested, must succeed.

When a list entry is deleted and a list-state transition results, the list monitors are notified. The list-notification command does not have to complete before the delete-list-entry command completes.

The retry buffer is written, depending on the retry index.

When a list entry is deleted, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When the global-lock manager is replaced and there are one or more other local-lock managers, or when a local-lock manager is replaced with the same value, then the lock-table-entry value and an indicative response code are returned in the response operands.

When the global-lock manager comparison fails, the lock-table-entry value and an indicative response code are returned in the response operands.

When the designated list entry exists but the requested version-number comparison fails, the designated list-entry controls and an indicative response code are returned in the response operands.

When the designated list entry exists but the requested list-number comparison fails, the designated list-entry controls and an indicative response code are returned in the response operands.

When the designated list entry does not exist, an indicative response code is returned in the response operand.

WMLE Command

The WMLE command conditionally compares the list numbers 305 and 423, compares the list-set-entry counts, compares the list-entry counts 301 and 303 or list-element-counts 312 and 313, creates or replaces a list entry 302, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry controls 315, and conditionally updates the retry buffer.

The designated list entry or position is located, and, when requested, the version number is updated, the global-lock managers are compared, or the list entry is replaced or created, or any combination of the preceding processes is performed. When the global-lock managers are compared, the local-lock managers may be compared. When list-entry creation is requested, the list-set-entry counts and the list-entry counts or list-element counts are compared. When list-entry replacement is requested, the list numbers and version numbers may be compared. When the global-lock managers are compared, the lock-table entry may be written. In order for a list entry to be written and moved, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the write-and-move-list-entry command completes.

The retry buffer is written, depending on the retry index.

When a list entry is written and moved, the list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the list set is full and list-entry creation is requested, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

When the list-entry name already exists and list-entry creation is requested, an indicative response code is returned in the response operand.

MRLE Command

The MRLE command conditionally compares the list numbers 305 and 423, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry values 306 and 309, returns the designated list-entry controls 315, and conditionally updates the retry buffer.

The list entry and the designated target position are located, the list-entry counts or list-element counts are compared, and, when requested, the list numbers are compared, the version numbers are compared, the version numbers are updated, or the global-lock managers are compared, or any combination of the preceding processes is performed. When the global-lock managers are compared, the local-lock managers may be compared. In order for a list entry to be moved and read, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the move-and-read-list-entry command completes.

The retry buffer is written, depending on the retry index.

When a list entry is moved and read, the designated list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response code.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit or the list-element count matches or exceeds the list-element-count limit, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

RDLE Command

The RDLE command conditionally compares the list numbers 305 and 423, compares the version numbers 304 and 421, conditionally updates the version number 304 with 411, compares the global-lock managers 207 and 415, compares the local-lock managers 208 and 416, writes the lock-table entry 206, deletes the designated list entry 302, returns the designated list-entry values 306 and 309, returns the designated list-entry controls 315, and conditionally updates the retry buffer.

The list entry is located and, when requested, the list number is compared, the version numbers are compared, or the global-lock managers are compared, or any combination of the preceding processes is performed. When the global-lock managers are compared, the local-lock managers may be compared. In order for a list entry to be read and deleted, these processes, when requested, must succeed. In order for a lock-table entry to be written, all of these processes except for local-lock manager comparison, when requested, must succeed.

When a list entry is deleted and a list-state transition results, the list monitors are notified. The list-notification command does not have to complete before the read-and-delete-list-entry command completes.

The retry buffer is written, depending on the retry index.

When a list entry is read and deleted, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operand.

When a global-lock manager comparison fails, the lock-table-entry value and an indicative response code are returned in the response operands.

When the designated list entry exists but the requested version-number comparison fails, the designated list-entry controls and an indicative response code are returned in the response operands.

When the designated list entry exists but the requested list-number comparison fails, the designated list-entry controls and an indicative response code are returned in the response operands.

When the designated list entry does not exist, an indicative response code is returned in the response operand.

Multiple-list-entry Commands

The multiple-list-entry commands are:
Read-list (RL),
Read-list-set (RLS),
Delete-list-set (DLS), and
Delete-list-entries (DLES).

RL Command

The RL command conditionally compares the list numbers 305 and 423, and the version numbers 304 and 421. It returns the read-list entries count, the list-entry controls 315 of the next list entry 302, zero or more list-entry values 306 and 309, zero or more list-entry controls 315, or any combination of the preceding.

Figure 14:
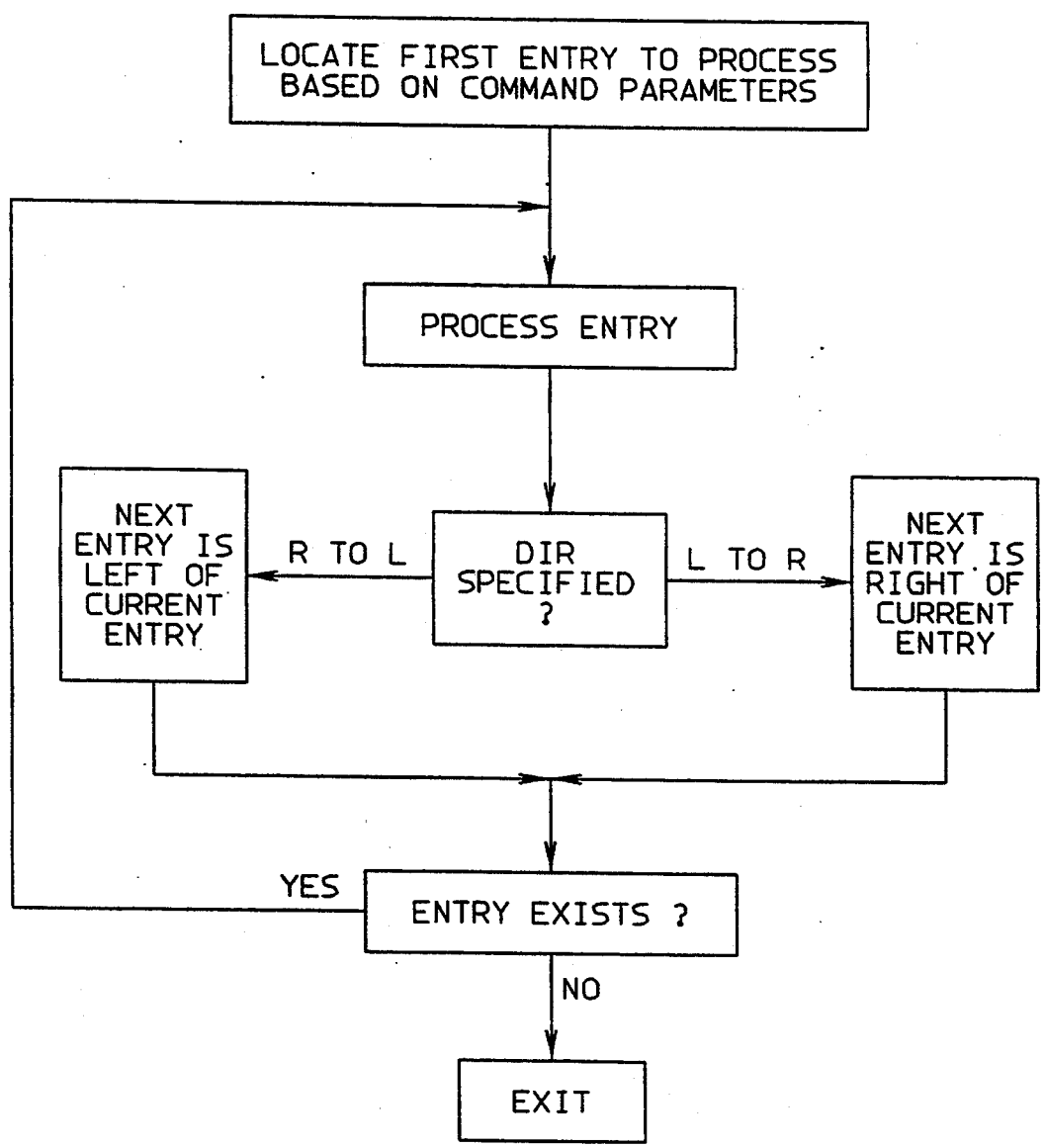
FIG. 14 is a flowchart illustrating the process of scanning for list entries by direction, for multiple list entry commands.

When requested, the list numbers are compared before the first list entry is scanned. (The scanning process is illustrated in FIG. 14.) The list entries are scanned starting at the designated position and proceeding in the direction specified until a model-dependent time period elapses, the data area is filled, or the last list entry is scanned. Each list entry is located and, when requested, the version numbers are compared. In order for any list entries or list-entry controls to be read, the list-number comparison, when requested, must succeed. In order for a particular list entry or list-entry controls to be read, the version-number comparison, when requested, must succeed.

The list-entry controls and adjunct list entry for the first list entry scanned are placed in the message-response block. The data list entry for the first list entry and all subsequent list-entry controls, adjunct list entries and data list entries are placed in the data block.

When the last list entry is scanned, the read-list-entries count equaling the number of data or adjunct list entries or list-entry controls stored and an indicative response code are returned in the response operands.

When the data block is filled or a model-dependent time period has elapsed, then the read-list-entries count equalling the number of data or adjunct list entries or list-entry controls stored in the message-response block and data block, the list-entry controls of the next list entry in the sequence to be scanned and an indicative response code are returned in the response operands.

When the specified data-block size is not large enough to contain the information specified by the read-list type for at least one list entry, an indicative response code is returned in the response operand.

When the designated list entry exists but the requested list-number comparison fails, the designated-list-entry controls and an indicative response code are returned in the response operands.

When the designated list entry does not exist, an indicative response code is returned in the response operand.

RLS Command

The RLS command conditionally compares the list numbers 305 and 423 and the version numbers 304 and 421. It returns the read-list entries count, the restart token, zero or more list-entry values 306 and 309, zero or more list-entry controls 315, or any combination of the preceding.

The list entries within the list set are scanned starting at the restart token specified until a model-dependent time period elapses, the data area is filled, or the last list entry is scanned. A zero restart token starts the processing, and a nonzero token restarts the processing at the next list entry. Each list entry is located and, when requested, the version numbers are compared, or the list numbers are compared, or any combination of the preceding processes is performed. In order for a particular list entry or list-entry controls to be read, the version-number comparison and list-number comparison, when requested, must succeed.

The list-entry controls and adjunct list entry for the first list entry scanned are placed in the Message Response Block (MRB). The data list entry for the first list entry and all subsequent list-entry controls, adjunct list entries and data list entries are placed in the data block.

When the last list entry is scanned, the read-list-entries count equaling the number of data or adjunct list entries or list-entry controls stored and an indicative response code are returned in the response operands.

When the data block is filled or a model-dependent time period has elapsed, then the read-list-entries count equalling the number of data or adjunct list entries or list-entry controls stored in the message-response block and data block, the restart token, and an indicative response code are returned in the response operands.

When the specified data block size is not large enough to contain the information specified by the read-list type for at least one list entry, an indicative response code is returned in the response operand.

When the restart token is invalid, an indicative response code is returned in the response operand.

DLS Command

The DLS command conditionally compares the list numbers 305 and 423 and the version numbers 304 and 421. It returns the delete-list entries count, and the restart token. It deletes zero or more list-entries 302.

The list entries within the list set are scanned starting at the restart token specified until a model-dependent time period elapses or the last list entry is scanned. A zero restart token starts the processing, and a nonzero token restarts the processing at the next list entry. Each list entry is located and, when requested, the version numbers are compared, or the list numbers are compared, or any combination of the preceding processes is performed. In order for a particular list entry to be deleted, the version-number comparison and list-number comparison, when requested, must succeed.

When a list entry is deleted and a list-state transition results, the list monitors are notified. The list-notification command does not have to complete before the delete-list-set command completes.

When the last list entry is scanned, the delete-list-entries count equaling the number of list entries deleted and an indicative response code are returned in the response operands.

When a model-dependent time period has elapsed, the delete-list-entries count equaling the number of list entries deleted, the restart token, and response code 1 are returned in the response operands.

When the restart-token operand is invalid, an indicative response code is returned in the response operand.

DLES Command

The DLES command conditionally compares the list numbers 305 and 423 and the version numbers 304 and 421. It returns the delete-list entries count, and the current data index. It deletes zero or more list-entries 302.

The list entries within the list set are scanned starting at the first list entry specified by the starting data index and continuing in the same order as specified in the data block. Each list entry is located and, when requested, the version numbers are compared, or the list numbers are compared, or any combination of the preceding processes is performed. In order for a particular list entry to be deleted, the version-number comparison and list-number comparison, when requested, must succeed.

When a list entry is deleted and a list-state transition results, the list monitors are notified. The list-notification command does not have to complete before the delete-list-entries command completes.

When the last list entry specified by the ending data index is scanned, the delete-list-entries count equaling the number of list entries deleted and an indicative response code are returned in the response operands.

When a model-dependent time period has elapsed, the delete-list-entries count equaling the number of list entries deleted, the current data index of the next list entry to be scanned, and an indicative response code are returned in the response operands.

When the designated list entry does not exist, the delete-list-entries count equaling the number of list entries deleted, the current data index of the nonexistent list entry, and an indicative response code are returned in the response operands.

The invention claimed is:

1. An apparatus for sharing data among two or more programs operating in a system comprising one or more processors, each of said one or more processors coupled to a Structured External Storage (SES) processor, said apparatus comprising:
   a) communications means for communicating list command messages between one of said two or more programs and the SES;
   b) a list structure means in said SES comprising one or more lists, each of said one or more lists comprising a list control means and none or more list entries; and
   c) message processor means in said SES comprising list function means for performing list functions on one or more of said none or more list entries in response to one of said list command messages, said list function means comprising a create function means for creating a new list entry on a first of said one or more lists, assigning and returning to said one of said two or more programs a List Entry Identifier (LEID) being unique and not reusable within said list structure means.

2. The apparatus of claim 1 in which each of said list entries comprises one or more list elements, in which said one of said list command messages comprises a list element number value, and in which said new list entry comprises n list elements where n equals said list element number value.

3. The apparatus of claim 1 in which said list function means further comprises a compound function means for atomically performing a move function and a second function, said move function moving said new list entry from said first of said one or more lists to a second of said one or more lists while retaining said LEID.

4. The apparatus of claim 3 in which said second function is a read function.

5. The apparatus of claim 3 in which said second function is a write function,

6. An apparatus for sharing data among two or more programs operating in a system comprising one or more processors, each of said one or more processors coupled to a Structured External Storage (SES) processor, said apparatus comprising:
  a) communications means for communicating list command messages between one of said two or more programs and the SES;
  b) a list structure means in said SES comprising one or more lists, each of said one or more lists comprising a list control means and none or more list entries; and
  c) message processor means in said SES comprising list function means for performing list functions on more than one of said none or more list entries in response to only one of said list command messages, said list function means comprising a create function means for creating a new list entry on a first of said one or more lists, assigning and returning to said one of said two or more programs a List Entry Identifier (LEID) being unique and not reusable within said list structure means.

7. The apparatus of claim 3 in which said one of said list command messages comprises a Direction operand means for specifying a target position for said new list entry.

8. The apparatus of claim 6 in which said only one of said list command messages comprises a Direction operand means for specifying an order of processing said more than one list entries.

9. The apparatus of claim 1 in which said one of said list command messages comprises a list entry name assigned by said one of said two or more programs and in which said create function means comprises means for rejecting said list entry name if said list entry name is already assigned to one of said list entries in said list structure means.

10. The apparatus of claim 1 in which one of said one or more lists comprises one or more keyed list entries, each of said one or more keyed list entries comprising key means for determining a relative position within said one of said one or more lists, in which said one of said list command messages comprises a list number, a key, and a direction, and in which said list function means further comprises a locate function means for locating a particular list entry in said one of said one or more lists identified by said list number by searching for said key in an order specified by said direction.

11. The apparatus of claim 10 in which said one of said list command messages further comprises a selection predicate means, said selection predicate means further identifying a manner of searching said list for said particular list entry having said key.

12. The apparatus of claim 11 in which said selection predicate means is "equal to".

13. A method for sharing data among two or more applications operating in a system comprising one or more processors, each of said one or more processors coupled to a Structured External Storage (SES) processor, said method comprising the computer implemented steps of:
  a) allocating a list structure in said SES, said list structure capable of holding one or more lists, each of said one or more lists capable of holding one or more list entries;
  b) sending a list command message from one of said two or more applications to said SES, said list command message comprising a list identifier, a list entry name, a list entry, and a create function request;
  c) in response to said list command message, performing a create function in said SES, said create function comprising the steps of:
    i) sending an error indication to said one of said two or more applications if said list entry name is duplicative of another list entry name within said list structure;
    ii) assigning a unique and non-reusable List Entry Identifier (LEID) to said list entry if said list entry name is not duplicative of said another list entry name within said list structure, placing said list entry on said one of said one or more lists identified by said list identifier, and returning said LEID to said one of said two or more applications.

14. A method for sharing data among two or more applications operating in a system comprising one or more processors, each of said one or more processors coupled to a Structured External Storage (SES) processor, said method comprising the computer implemented steps of:
  a) allocating a list structure in said SES, said list structure capable of holding one or more lists, each of said one or more lists capable of holding one or more list entries;
  b) sending a list command message from one said two or more applications to said SES, said list command message comprising a list identifier, a list entry, a key, and a create function request;
  c) in response to said list command message, performing a create function in said SES, said create function comprising the steps of:
    i) assigning a unique and non-reusable List Entry Identifier (LEID) to said list entry;
    ii) placing said list entry on said one of said one or more lists identified by said list identifier, in a position relative to other list entries, if any, specified by said key;
    iii) returning said LEID to said one of said two or more applications.

15. The method of claim 13 further comprising the steps of:
  a) sending another list command message from said one of said two or more applications to said SES, said another list command message comprising said list entry name and a retrieve function request;
  b) in response to said another list command message, performing a retrieve function in said SES, said retrieve function comprising the steps of:
    i) locating said list entry identified by said list entry name;

ii) returning said list entry identified by said list entry name to said one of said two or more applications.

16. The method of claim 13 further comprising the steps of:
   a) sending another list command message from said one of said two or more applications to said SES, said another list command message comprising said LEID and a retrieve function request;
   b) in response to said another list command message, performing a retrieve function in said SES, said retrieve function comprising the steps of:
      i) locating said list entry identified by said LEID;
      ii) returning said list entry identified by said LEID to said one of said two or more applications.

17. The method of claim 13 further comprising the steps of:
   a) sending another list command message from said one to said two or more applications to said SES, said another list command message comprising said list identifier, and a direction;
   b) in response to said another list command message, performing a retrieve function in said SES, said retrieve function comprising the steps of:
      i) locating said list entry, within said list identified by said list identifier, by selecting according to said direction a leftmost or rightmost list entry accordingly;
      ii) returning said list entry, identified by said step of locating to said one of said two or more applications.

18. The method of claim 14 further comprising the steps of:
   a) sending another list command message from said one of said two or more applications to said SES, said another list command message comprising said LEID and a retrieve function request;
   b) in response to said another list command message, performing a retrieve function in said SES said retrieve function comprising the steps of:
      i) locating said list entry identified by said LEID;
      ii) returning said list entry identified by said LEID to said one of said two or more applications.

19. The method of claim 14 further comprising the steps of:
   a) sending another list command message from said one of said two or more applications to said SES, said another list command message comprising said list identifier, said key, a direction, and a key request type;
   b) in response to said another list command message, performing a retrieve function in said SES, said retrieve function comprising the steps of:
      i) locating said list entry within said list identified by said list identifier, said list entry being selected from said list by said key, said direction, and said key request type;
      ii) returning said list entry, located in step of locating, to said one of said two or more applications.

20. The method of claim 14 further comprising the steps of:
   a) sending another list command message from said one of said two or more applications to said SES, said another list command message comprising said list identifier, and a direction;
   b) in response to said another list command message, performing a retrieve function in said SES, said retrieve function comprising the steps of:
      i) locating said list entry, within said list identified by said list identifier, by selecting according to said direction a leftmost or rightmost list entry accordingly;
      ii) returning said list entry, identified by said step of locating, to said one of said two or more applications.

* * * * *